United States Patent
Sotelo et al.

(10) Patent No.: US 11,423,447 B2
(45) Date of Patent: *Aug. 23, 2022

(54) INTEGRATED ARCHITECTURE FOR PERFORMING ONLINE ADVERTISING ALLOCATIONS

(71) Applicant: OpenX Technologies, Inc., Pasadena, CA (US)

(72) Inventors: Caleb Daniel Sotelo, Pasadena, CA (US); Anthony Molinaro, Pasadena, CA (US)

(73) Assignee: OPENX TECHNOLOGIES, INC., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,627

(22) Filed: Apr. 6, 2020

(65) Prior Publication Data
US 2020/0302489 A1    Sep. 24, 2020

Related U.S. Application Data

(63) Continuation of application No. 14/461,186, filed on Aug. 15, 2014, now Pat. No. 10,614,490.
(Continued)

(51) Int. Cl.
*G06Q 30/02* (2012.01)

(52) U.S. Cl.
CPC ..... *G06Q 30/0277* (2013.01); *G06Q 30/0246* (2013.01); *G06Q 30/0275* (2013.01)

(58) Field of Classification Search
CPC ........... G06Q 30/0277; G06Q 30/0246; G06Q 30/0275
See application file for complete search history.

(56) References Cited

U.S. PATENT DOCUMENTS

| 7,296,033 B1 | 11/2007 | Lynch |
| 8,255,285 B1 | 8/2012 | Peretz et al. |

(Continued)

FOREIGN PATENT DOCUMENTS

WO    2011/041465    4/2011

OTHER PUBLICATIONS

S. Sluis, "The Rise of 'Header Bidding' and the End of the Publisher Waterfall", Jun. 18, 2015, AdExchanger. (Year: 2018).*

(Continued)

*Primary Examiner* — Mario C. Iosif
(74) *Attorney, Agent, or Firm* — Patent Law Works LLP

(57) ABSTRACT

An improved architecture including system and methods for online advertising placement that provide possibly defaulting advertisement tags the opportunity to serve an advertisement ahead of a lower value tag that is guaranteed to fill, resulting in higher CPMs (i.e., Cost Per Mille) for web publishers. The system and methods are configured to deterministically render an advertisement impression from a list of possibly defaulting advertisements in a JavaScript-enabled web browser. The knowledge of the complete outcome of such an "ad chain" at render-time significantly reduces complexity and latency in the supporting ad server. The system and method centers around a novel JavaScript approach to detect when an advertisement has been loaded but not defaulted. Additionally, the system and methods integrate the network and RTB demand channels by looking at all demand sources simultaneously and selecting the buyer from within the user's browser, and address predictive pricing to further enhance the online advertising placement process.

19 Claims, 17 Drawing Sheets

Related U.S. Application Data

(60) Provisional application No. 62/009,297, filed on Jun. 8, 2014, provisional application No. 61/866,439, filed on Aug. 15, 2013.

(56) References Cited

U.S. PATENT DOCUMENTS

| | | | |
|---|---|---|---|
| 8,438,184 | B1 | 5/2013 | Wang et al. |
| 9,053,492 | B1 | 6/2015 | Stanley et al. |
| 2003/0212648 | A1 | 11/2003 | Cunningham et al. |
| 2007/0011050 | A1 | 1/2007 | Klopf et al. |
| 2008/0097838 | A1 | 4/2008 | Lin et al. |
| 2008/0162329 | A1 | 7/2008 | Knapp et al. |
| 2009/0204541 | A1 | 8/2009 | Zhuk et al. |
| 2009/0216642 | A1 | 8/2009 | Ho et al. |
| 2009/0234713 | A1* | 9/2009 | Bi .................. G06Q 30/08 705/14.54 |
| 2010/0131373 | A1* | 5/2010 | Kubasov ............ G06Q 30/0277 705/14.73 |
| 2010/0145809 | A1 | 6/2010 | Knapp et al. |
| 2010/0241511 | A1 | 9/2010 | Cunningham et al. |
| 2011/0040636 | A1 | 2/2011 | Simmons et al. |
| 2011/0173126 | A1* | 7/2011 | Knapp .................. G06Q 30/02 705/14.71 |
| 2011/0185016 | A1 | 7/2011 | Kandasamy et al. |
| 2011/0191170 | A1 | 8/2011 | Zhang et al. |
| 2011/0246297 | A1* | 10/2011 | Buchalter ............ G06Q 30/02 705/14.53 |
| 2011/0246298 | A1 | 10/2011 | Williams et al. |
| 2011/0270689 | A1 | 11/2011 | Klopf et al. |
| 2011/0282751 | A1 | 11/2011 | Kwon et al. |
| 2012/0011019 | A1 | 1/2012 | Wakim |
| 2012/0036023 | A1 | 2/2012 | Das et al. |
| 2012/0136873 | A1 | 5/2012 | Shaffer et al. |
| 2013/0073401 | A1 | 3/2013 | Cook |
| 2013/0080264 | A1 | 3/2013 | Umeda |
| 2013/0124357 | A1* | 5/2013 | He ..................... G06Q 30/08 705/26.3 |
| 2013/0138514 | A1 | 5/2013 | Yan et al. |
| 2013/0163428 | A1 | 6/2013 | Lee et al. |
| 2013/0191439 | A1 | 7/2013 | Kem et al. |
| 2013/0311301 | A1* | 11/2013 | Grant ................ G06Q 30/0273 705/14.69 |
| 2013/0339126 | A1 | 12/2013 | Cui et al. |
| 2013/0339139 | A1* | 12/2013 | Meyers .............. G06Q 30/0241 705/14.49 |
| 2014/0033228 | A1 | 1/2014 | Lucash |
| 2014/0100944 | A1* | 4/2014 | Zhu ................... G06Q 30/0275 705/14.71 |
| 2014/0188630 | A1 | 7/2014 | Balazs et al. |
| 2014/0223462 | A1 | 8/2014 | Aimone et al. |
| 2014/0324603 | A1 | 10/2014 | Savkar et al. |

OTHER PUBLICATIONS

International Search Report and Written Opinion for International Application No. PCT/US2014/051376, dated Feb. 11, 2015, 17 pgs.
Aqeel et al., "Untangling Header Bidding Lore: Some myths, some truths, and some hope," University of Illinois, Apr. 2, 2020, available online at https://pbg.cs.illinois.edu/papers/aqeel20headerbidding.pdf, 17 pgs.
Morton et al. , "Roadmap for a Digital Advertising Monopolization Case Against Google," Omidyard Network, May 2020, 40 pgs.
Pachilakis et al., "No. More Chasing Waterfalls: A Measurement Study of Header Bidding Ad-Ecosystem," Proceedings of the Internet Measurement Conference, Oct. 2019, pp. 280-293.
Sluis, "The Rise of 'Header Bidding' and the End of the Publisher Waterfall," AdExchanger, Jun. 18, 2015, 12 pgs.
Zawadzinski, "Ad serving insights: Ad invocation codes and placement tags," Clearcode Blog, Feb. 17, 2013, 11 pgs.

* cited by examiner

INTEGRATED ARCHITECTURE FOR PERFORMING ONLINE ADVERTISING ALLOCATIONS

CROSS REFERENCE TO RELATED APPLICATIONS

This application is a continuation of U.S. patent application Ser. No. 14/461,186, entitled "Integrated Architecture for Performing Online Advertising Allocations," filed Aug. 15, 2014, which claims priority under 35 USC § 119(e) to U.S. Application No. 61/866,439, entitled "System and Methods for Deterministically Rendering Defaulting Advertisement Chains," filed Aug. 15, 2013, and U.S. Application No. 62/009,297, entitled "System and Method for Demand Fusion and Predictive Pricing," filed Jun. 8, 2014, the entirety of both applications are herein incorporated by reference.

BACKGROUND

1. Field of the Invention

The present invention relates generally to the field of digital media display advertising. In particular, the present invention relates to the field of optimizing publisher revenue in server or supply-side platforms (SSPs) that enable publishers to manage their desktop and mobile advertising impression inventory and maximize revenue from digital media by providing an integrated architecture for advertising allocations by implementing enhanced features in supply-side platforms that fuse multiple demand channels and real-time bidding.

2. Description of the Related Art

Digital advertising involves the presentation of display or mobile advertisements (e.g., banner ads, images, text, and/or hyperlinks of various shapes and sizes) embedded into web pages or mobile applications that are rendered and displayed to Internet users. For example, when an Internet user enters a Uniform Resource Locator (URL) into the address bar of a browser application and directs the browser application to request the web page corresponding with the URL, the web page that is rendered and displayed to the user may include one or more display advertisements. Although the goal of displaying advertisements may vary from one advertisement campaign to the next, many advertisement campaigns are planned with the objective of driving traffic to a website of the advertiser. For example, the owners of a small online business having a web-based retail store for selling tennis equipment (e.g., tennis racquets, balls, clothes and shoes) may desire to embed display advertisements in the web pages of a web-based tennis magazine or blog, with the hope that the readers of the tennis magazine or blog will view and select the ads for the online tennis store, and ultimately conclude a transaction with the web-based tennis store. Similarly, the content publisher (e.g., the operator of the web-based tennis magazine or blog) may desire to generate revenue by offering advertisement space on web pages to advertisers for the display of their advertisements.

There are a variety of existing methods and mechanisms by which content publishers can make their ad spaces available to advertisers for purchasing, and by which advertisers find and purchase the advertisement spaces of content publishers. One way is through direct negotiation. For instance, an advertiser may directly approach a content publisher with a request to purchase advertisement space in that content publisher's web pages or mobile applications. Another way that a content publisher may offer advertisement space for sale is through an advertisement network or an advertisement exchange. Advertisement networks and advertisement exchanges are companies that connect content publishers with advertisers who desire to have advertisements embedded in the content of other content publishers. Advertisement networks and advertisement exchanges operate in a variety of different ways. More and more, given the complexity of the operations involved, advertisement networks and advertisement exchanges have become highly automated such that both the content publisher and advertiser can conclude transactions via web-based interfaces and automated auctions, without additional personal interaction.

One problem that content publishers face with existing methods and mechanisms that are used to offer advertisement spaces to advertisers is the limited audience of potential advertisers that can be reached through any particular ad network or advertisement exchange. For example, some advertisers may work with only one advertisement or ad network. Therefore, unless a content publisher is working with that particular ad network, the content publisher will not have access to those advertisers. Consequently, in addition to directly negotiating with one or more advertisers, a content publisher may be required to utilize multiple advertisement networks and/or advertisement exchanges to find the advertisers that are willing to purchase the content publisher's inventory of ad spaces. This typically requires that the content publisher establish several user accounts, and become familiar with the various interfaces, policies and procedures of the several ad networks and/or ad exchanges that the content publisher utilizes. Furthermore, the content publisher will be required to retrieve and analyze performance reports, often in varying formats for each ad network and/or ad exchange with which the content publisher is using.

Another problem that content publishers frequently encounter is finding the optimum or best price at which to offer ad spaces to advertisers. For instance, when a content publisher is using a single ad network, the advertisers participating in that ad network may not accurately represent the overall market (specifically, the demand in the broader market) for the offered ad space. Therefore, if a content publisher sets the price for an ad space too low, the content publisher will not realize the fair market value of the ad space. Even in scenarios where the ad network or ad exchange uses an auction system, if the publisher's reserve price is set too low, the limited number of advertisers in any given ad network or ad exchange are not likely to bid the price up to the fair market value, and thus the content publisher is not likely to realize the fair market value of the ad spaces. Consequently, content publishers are left with the burden of adjusting the price at which their ad spaces are being offered on multiple ad networks and/or ad exchanges, in an effort to find the optimal price. This of course is not an easy task, as the optimal price is likely to change over time, as demand changes and economic conditions change.

In online advertising environments, several technology platforms exist to facilitate efficient transactions including ad exchanges, which are centralized platforms for aggregating the impressions offered across multiple ad networks and matching them, based on myriad criteria (advertiser's target, budget, and placement requirements) with the most appropriate advertisements. Real time bidding ("RTB") platforms facilitate a dynamic auction process where each impression is bid for in real time to facilitate cost efficiency, higher performance, and more accurate targeting and measurement of advertisement inventory etc. Demand-side platforms ("DSP") provide buyers with direct access for real time bidding to multiple sources of inventory. DSP platforms may be operated by agencies or large advertisers who are the buyers. Publishers use yield management techniques to increase advertisement revenue. This typically involves managing multiple networks. Supply-side platforms ("SSPs") exist that use the data generated from bidding of impressions to enable publishers to increase the value of their inventory, manage their advertising impression inventory and maximize revenue from digital media. Such platforms offer an efficient, automated, and secure way to access different sources of advertising income that are available and provide insights into the various revenue streams and audiences. More and more, large web publishers of the world use a supply-side platform to automate and optimize selling their online media space.

In a typical adverting scenario, a SSP on the publisher side interfaces with an ad exchange, which in turn interfaces with a demand-side platform (DSP) on the advertiser side. This type of system allows advertisers to provide online advertising before a selected target audience. Often real-time bidding (RTB) mechanisms are used to complete DSP transactions.

In many instances, information is often transferred between an advertisement ("ad") server and a user's web browser. The primary transaction is an "ad request," which is typically composed of two parts: (1) the request, by which a message containing information relevant for advertisement selection is composed and sent to the advertisement server and (2) the response, by which the advertisement server returns the selected advertisements back to the client or consumer.

Advertisement requests are typically initiated or informed, at least in a desktop environment, by a snippet of HTML (Hyper Text Markup Language) on a web page called an "ad tag." In mobile technologies, other types of code may be used for this purpose. The contents of an ad tag may include placeholder elements, fallback images, and scripts that trigger ad requests. An ad tag script is configured to call into a local JavaScript file, referred to here as a "tag library." The tag library is responsible for constructing and issuing advertisement requests, handling advertisement responses, and displaying returned advertisements.

A returned advertisement is often in the form of an arbitrary string of HTML called a "creative." The tag library displays the advertisement by adding the creative to the current web page in the appropriate location. In the simplest case, the creative contains an image or "Flash" element representing what is ultimately visible to the user on his or her user device as the advertisement. In some instances, the creative may also represent the HTML for a third-party advertisement (ad) tag. The method described in this application is particular to scenarios where an advertisement server returns third-party tags. When third-party tags are added to the page, the entire advertisement request process is repeated under the control of the third party.

In instances when a creative is added to the web page, a notification otherwise referred to as the impression is sent back to the advertisement server to confirm that the advertisement has been displayed. It should be recognized that the term impression also generally refers to the event in which a user views a slot into which an advertisement can be served, along with any contextual information that could inform the advertisement selection process. In such scenarios, impressions are what advertisers are ultimately interested in purchasing from web publishers.

Digital advertising supply, or "inventory," refers to the impressions that website publishers or mobile application developers have made available for advertisers to purchase. Impressions are eventually associated with advertisement units, which are the physical spaces on web pages reserved for displaying advertisements. Traditionally, inventory has been categorized into groups. As one example, inventory may be referred to as "Premium Inventory," which represents impressions that are sold directly to advertisers who guarantee that they would pay a fixed price for a certain quantity. These may be associated with advertisement units that can be viewed without user scrolling or alternatively, with spaces that exist on web pages with heavy traffic. Although typically a smaller percentage of the inventory available, premium inventory is more valuable to advertisers because of its higher exposure to users.

Yet another type of inventory is "Remnant Inventory," which represents the remaining impressions that have not been sold directly to buyers. These impressions may be associated with less visible, lower traffic advertisement units that are naturally less valuable to advertisers because of low exposure to users. Because the amount of remnant inventory that is available is typically much greater than that of premium inventory, a major portion of it is often remains unsold. Alternatively, some publishers have direct relationships with advertisers and others go through intermediaries.

Ad networks have historically aggregated remnant inventory and matched it with advertiser demand. Ad networks provide publishers with ad tags that can be incorporated into their web pages as described above. Such tags are associated with different compensation methods depending on the type of inventory targeted. For remnant inventory, the most common method is "Cost per Mille," or CPM, which is the price the ad network agrees to pay for every 1,000 impressions an ad receives. Even with ad network tags, a given impression is often unable to find a suitable ad. In such instances, the ad network may return a predetermined value in place of an advertisement. This value is often provided by the end user (e.g., a publisher's operations person) when requesting a tag from the ad network, and may be in the form of HTML, JavaScript, or another type of ad tag. The capability to return this predetermined value when an advertisement cannot be found is referred to in the industry as a "defaulting tag." If no default value has been configured, no advertisement is shown in the advertisement unit slot, but this is acceptable behavior because of the lower priority for filling remnant inventory.

It should be recognized that defaulting ad tags are different from "fill-all" tags, which guarantee the task of serving an ad, but often at a much lower CPM. In many instances, "fill-all" tags are often used as the default value for defaulting tags. Two features of defaulting ad tags are relevant to understanding the process disclosed here. A first feature is that defaults are only determined at render-time. The anatomy of a defaulting tag is such that the event of a default can only be determined when the tag is attempted in a web browser. This is because advertisement selection is often based on contextual information such as HTTP cookies, the content of the web page, and the size of the user's screen. Yet another feature is that an effective CPM must be calculated. Ad networks that default only pay for an impression if an advertisement is found and no default was required. However the CPM for a possibly defaulting tag does not take into account the rate at which it defaults, i.e., there is no differentiation in value between two tags with the same CPM that default at very different rates. Thus, the effective CPM of a defaulting tag or in other words, a true value of the defaulting tag may only be determined by keeping a running measurement of its default rate. A natural consequence of using defaulting ad tags is that a portion of publisher inventory either goes unsold or is sold at a much lower price.

Traditional SSPs were designed before real-time buying or bidding (RTB) emerged; hence these platforms often add real-time bidding ("RTB") demand to other demand sources, such as DSPs or ad networks, as an afterthought. Because the demand channels are not fully integrated with the core technology of such traditional SSPs, they implement an "either-or" decisioning approach to buyer selection. When impressions become available, the traditional SSP must choose upfront whether to send the impression to network buyers or to solicit buyers in the real-time auction. This inefficiency has minimized competition and lowered the true value of impressions, substantially shrinking publisher revenue, especially given the constant regularity with which networks default on an impression, potentially leaving no alternative but to serve a house advertisement, public service announcements or other very low CPM 100% fill network.

Thus, traditional SSPs have a 1) fractured demand, that is, no competition from network and RTB demand; 2) impression loss, that is negative results from network defaults and advertisement server hops; 3) higher latency due to impressions being sent outside to third party systems; 4) high discrepancy rates, because they offer inventory to multiple demand sources, and must call several ad servers. When filling an impression, the many SSPs choose at the outset whether to send the impression to an advertisement network or RTB source as they cannot access both channels simultaneously. Thus, traditional SSPs have conventionally taken an "either/or" approach. If an impression is sent to an advertisement network and the network defaults (or passes the impression back), the impression cannot be offered to an RTB buyer.

SUMMARY

The present invention overcomes the deficiencies and limitations of prior systems and methods, at least in part by, providing a system and methods for deterministically rendering an ad impression from a list of possibly defaulting ads in a JavaScript-enabled web browser or mobile application. This is in accordance with innovative techniques in ad serving that solve the problems of the prior art, by detecting when a tag has defaulted and attempting to render another in its place, until an advertisement is served and an impression is billed. This innovation has resulted only in small amounts of inventory remaining as unsold and generating more revenue for web publishers.

In some implementations, systems referred to as SSDYCO (Server-side Dynamic Yield Curve Optimization) realize the concept of giving more valuable defaulting tags a chance to serve an advertisement before less valuable tags that are guaranteed to fill. This system revolves around "chain serving," which is a process by which the ad server returns a "chain" of ads in response to an ad request, rather than a single ad. The chain of ads begins with some number of potentially defaulting ad network tags and ends with a fill-all tag that does not default. In some implementations, these tags are arranged in order of decreasing value. The ad chain may then be processed in the user's browser. In some instances, a JavaScript tag library renders each tag in the chain and stops at the first tag that does not default. By this process, eventually, an impression is imputed to the tag that served an advertisement.

In some implementations, for detecting faults, the chain rendering process relies on the tag library's ability to detect when a tag has defaulted. This feature is significant because it requires the cooperation of the defaulting tag. As noted before, a defaulting ad tag is a third-party snippet of arbitrary HTML that may write anything, including scripts, into the webpage in the process of attempting to deliver an ad. When the tag is added to the page, the ad rendering process is no longer controlled by the tag library but has been handed off to a third party. Thus, in the event of a default, there is no immediate way for code originating from the tag to notify the tag library that a default has occurred. A channel of communication is made possible by the configuration of a default value as described above. Users may set the default value to some HTML that loads a web resource under their control, allowing the possibility of a programmatic response when a tag defaults. In this example, this default resource may be a static HTML file running JavaScript that notifies the waiting chain rendering algorithm of the default.

Yet another difficulty with defaulting tags stems from restrictions that exist due to the same-origin policy. While attempting to serve an ad, the tag may write out one or more nested iframes with third-party sources before defaulting. This means that in order to successfully notify the tag library of a default, the default resource will have to communicate with JavaScript running under another domain. The canonical approach to cross-domain communication is via a window.postMessage API. The chain-rendering algorithms used leverage this API, by first wrapping a chain tag in an unsourced or "friendly" iframe to which a postMessage listener is attached. The script executing in the default resource then broadcasts a postMessage with a default notification to every iframe it may be contained within. When the postMessage listener detects the message, the flow of control is handed back to the tag library, the defaulting iframe is identified and removed, and the next tag in the chain is attempted.

The chain serving solution uses chain-rendering algorithms, which are described in greater detail below. These chain serving solutions apply to desktop scenarios as well as mobile applications. For mobile applications, additional modifications may be made to adapt to the various mobile configurations that exist. Due to the single-threaded implementation of JavaScript in mainstream web browsers, a "thread" represents an asynchronous code path that does not execute simultaneously with other threads. Asynchronous events are added to an event queue and processed on a single true thread in the order received.

In some implementations, an "ad chain" is an ordered list of n ads with the following properties:
1. The first n−1 ads are possibly defaulting ads.
2. The ads are ordered by decreasing CPM.
3. The last ad in the chain is non-defaulting.

The word "link" is used to refer to a JavaScript model of each advertisement in the chain. The first n−1 of these links contains HTML representing third-party defaulting tags as described above. A link may include other properties such as width and height. A thread A may be JavaScript code in the local tag library that performs the following operations:
1. Receive an ad chain from the ad response.
2. For the next ad "link" in the chain:
   a. Remove any previously defaulted iframes.

b. Send a "possible impression" event to the server for this "link," possibly bundled with a "record default" event for a previously defaulted "link."
c. If "link" is a defaulting ad:
  i. Insert "link" HTML into an iframe.
  ii. Attach a "postMessage" listener to the iframe for detecting a default.
  iii. Add the iframe to the page. A Thread B may be scheduled at this point.
d. Otherwise "link" is the last ad in the chain (non-defaulting):
  i. Render "link" by adding its HTML to the page.

Thread B (The HTML in the current link's iframe) performs the following operations:
1. The ad HTML for "link" loads, attempting to serve an ad.
2. If the ad defaults, request the default resource:
  a. Execute JavaScript that broadcasts a default notification to link's iframe using "postMessage." A Thread C is scheduled at this point.

Thread C (The "postMessage" listener attached to the current "link's" iframe) performs the following operations:
1. A default notification is detected and control is passed back to the tag library in the parent window.
2. Thread A resumes at step (2) as discussed above with reference to Thread A.

In accordance with some other features, a server-side system receives all the possible impressions and record default events sent out of the user's browser during chain rendering. These events contain information that uniquely identify the particular ad tag attempted or defaulted and the particular chain rendering process they belong to. The server-side system is responsible for aggregating these events so that the impression may be attributed to the link of the chain that actually renders in order to provide correct billing and reporting data. This system calculates the impression from the most recently received information. For example, if the first link of the ad chain defaults, a possible impression event is recorded, and until more data from its chain rendering process is available, the impression for the entire transaction is imputed to that link. If a record default event is recorded for the same link, its potential impression is cancelled and a potential impression for the next link is counted.

Although this system may reliably determine the outcome of chain rendering processes, it has drawbacks. The first is that it is cost-prohibitive. In addition to having high availability requirements and a large memory footprint, this system must scale to the number of ad chains being served and rendered. Such systems require resources that must be maintained and deployed. A solution that avoids such additional expensive services is more desirable. Second, such systems are sometime incorrect. If a user navigates away from a web page or closes the browser midway through the chain rendering process, an impression may be incorrectly imputed to a tag that was about to default. This possibility is a primary reason why the system provides a server-side service. If events are aggregated in the user's browser and a single impression is sent after a delay, a much larger number of transactions are lost due to an increased time window during which the web page may be closed by a user. A third reason is that this system enforces a delay of fifteen minutes before the result of a chain rendering process is considered final. Ads usually take seconds to load or default, and ad chains typically contain fewer than ten ads. Therefore, other than instances in which a web page may be prematurely closed by a user, the data provided by this system has a high probability of being correct, but only after this delay. Yet, a system that relies on this delay is not easily incorporated into an ad serving system that deals with data greedily or deterministically.

The need for a server-side event aggregation system stems from not being able to determine in the tag library's chain rendering algorithm if an ad has loaded without defaulting. This difficulty is largely due to the third-party nature of defaulting ad tags; the tag library has no knowledge of the final state of an attempted tag that delivers an ad. Thus, without the ability to differentiate on the client-side between (1) a given tag having rendered an ad, and (2) the tag still being in a loading state, no impression may be deterministically imputed to a tag, as a consequence of which a latent aggregation system is required.

In accordance with the present invention, it is recognized that "deterministic" means that the impression for a given chain rendering process may be correctly and immediately imputed to the first tag in the ad chain that delivers an ad. The knowledge of the complete outcome of such an "ad chain" at render-time significantly reduces complexity and latency in the supporting ad server.

BRIEF DESCRIPTION OF THE DRAWINGS

The present invention is illustrated by way of example, and not by way of limitation in the figures of the accompanying drawings in which like reference numerals are used to refer to the same or similar elements.

DETAILED DESCRIPTION

Figure 1:
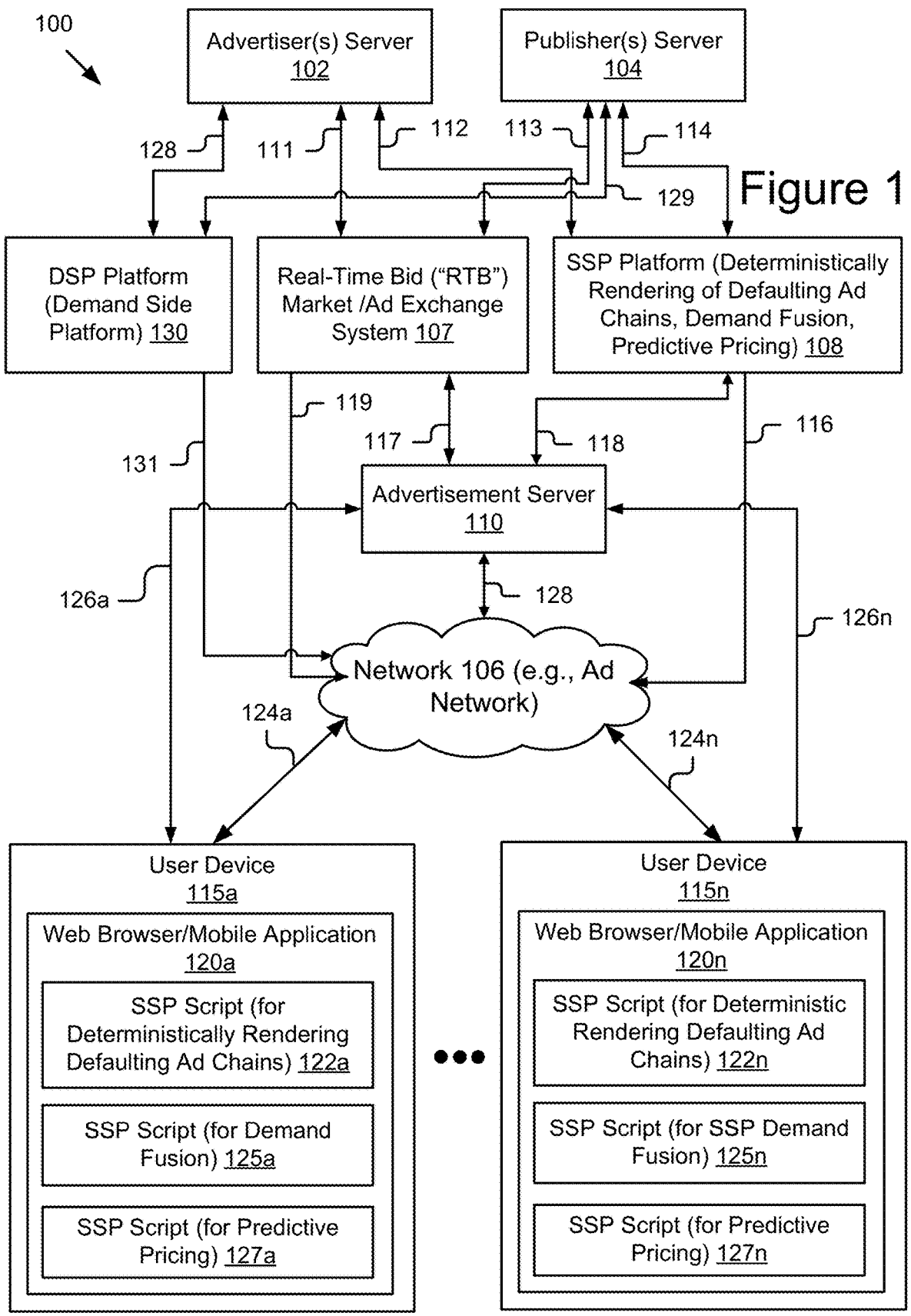
FIG. 1 is a block diagram illustrating an example system in accordance with the present invention for deterministically rendering defaulting advertisement chains operable in an example environment according to some implementations of the present technology.

An integrated architecture with system and methods that improve Supply-Side platform ("SSP") technology with enhanced features is disclosed to enable publishers to manage their advertising impression inventory and maximize revenue from digital media. The Supply-side technology fuses real time bidding ("RTB") and network demand to deliver significantly higher yield for publishers. Advantageously, this new approach solves fundamental issues that existed before. Specifically, by fusing Real-Time Bidding (RTB) and network demand into a single auction and by driving up price competition, the yield for publishers is significantly maximized.

The enhanced SSP platform provides mechanisms for deterministically rendering an advertisement chain in a user's web browser (or mobile application) in response to determining market demand. The term "deterministic" as used in this application implies that the impression for a given chain rendering process may be correctly and immediately imputed to the first tag in the advertisement chain that delivers a particular advertisement. The algorithms for deterministically rendering defaulting advertisement chains are described in greater detail below.

In contrast to prior SSP platforms, the new SSP platform in accordance with the present invention fuses all demand sources simultaneously, considers prices by using predictive pricing schemes (e.g., based on historical data) and dynamically selects the highest bidder within the user's browser, eliminating impression waste and optimizing yield by fostering competition between a publisher's networks and RTB demand. By using technology that fuses demand, the new SSP platform allows the RTB price to always be considered without having to execute a second auction for the same impression when an advertisement network defaults an impression. In addition, the new SSP platform provides multi-layered safeguards configured to monitor advertisement quality in order to protect the brand of the publishers and provides a sophisticated set of reports that may be customized that help publishers identify yield opportunities.

The improved SSP platform prevents any single impression from defaulting to earn a lower price, by providing an opportunity to seek a higher RTB price. The improved SSP platform may be configured to focus on either the advertisement quality or yield or both. In the event the desirable focus is both, the advertisement quality is significantly strengthened by technology to fuse the demand channels. Undoubtedly, these innovations have resulted in a meaningful increase in the yield for publishers in the digital advertising industry. In some implementations, by fusing RTB and network demand into the core SSP platform, competition is maximized and a true 100 percent yield-driven solution is created for publishers.

Advantageously, by fusing the RTB and network demand channels, accomplished by technologies that stack ranks the prices from both the RTB and network demand channels, with the ultimate decision on price and impression being delivered from the browser rather than from the server. This advantageously eliminates a requirement for multiple "hops" or visits back to the SSP platform and/or ad server when a network defaults. This innovation greatly reduces the potential for counting problems that can arise in legacy systems where multiple "hops" between systems can occur before a particular advertisement is finally monetized. This advantageously maximizes competition by maintaining all demand regardless of whether a network defaults.

In addition to the solution for publishers to optimize their RTB and network demand, the improved SSP also protects the publishers by providing a multi-layered approach for monitoring advertisement quality and scale. In addition to enhancing automated solutions, the improved SSP platform in accordance with the present invention also provides tools and controls that empower the publisher to enforce the quality of advertising brands. As some examples, the tools may include: 1) review and block a "creative" proactively within the account; 2) filter by brand, buyer, category, industry, advertisement type and other criteria; 3) identify and request advertisement removal via a browser plug-in and reporting; and 4) automated malware protection through algorithms and third-party solution providers. Yet another integral component to the new SSP platform is an expanded suite of sophisticated reports that may be easily customized to present metrics for identifying yield opportunities, identifying discrepancies and setting appropriate pricing. Improved features may include at least: 1) providing diverse reports for yield, bid landscape and details, and inventory performance; 2) provide capabilities to set and schedule monitoring, alerts, and real-time actions to address a discrepancy, fill rate, yield and bid landscape.

In some implementations of the present technology, to address the fused demand channels, "deterministic" chain rendering is enabled by a JavaScript method for determining at render-time if a particular advertisement has loaded without defaulting, obviating the need for a back-end aggregation system. This method involves operations including one by which the tag library may attach an "onLoad" listener to the iframe wrapping the current chain tag being attempted. In some implementations, the "load" event fires when the iframe and all of the synchronously downloaded resources within it have properly loaded. This may include images, scripts, and nested iframes. In the case of a default, the tag loads the default resource before the iframe has loaded, because the default resource is itself a child resource of the iframe that contains it. It then follows that a "default" "postMessage" event is scheduled into the browser's event queue before the "load" event. A subset of mainstream web browsers demonstrate unexpected behavior whereby an iframe's load event is processed before a postMessage event originating from within said iframe. The events can be effectively re-ordered by wrapping the iframe's onload handler code in a function that executes after a timeout of zero, causing any onload code to be re-appended to the browser's event queue and execute after an already queued postMessage event. Thus, if an iframe "load" event for the current link is detected without a corresponding "default" "postMessage" having been received, it can be assumed that an advertisement has been delivered, and an impression can be imputed and sent to the server immediately.

The new system and methods of the present invention address the numerous inefficiencies identified above that exist in traditional SSPs. It should be recognized a major defect was that when filing an impression, the traditional SSPs had to select at the outset whether to send the impression to an advertisement network or RTB source as they were not configured to access both channels simultaneously. Yet, to address this problem SSPs help publishers increase and optimize overall yield by finding the right buyers for any unsold inventory. The improved SSP functionalities fuse the network and RTB demand channels, by looking at all demand sources simultaneously and selecting the buyer from within the user's browser. The chain-serving technology ranks all potential buyers by price, and offers this data to the buyer with the highest bid who meets the requirements for advertisement quality. If that buyer defaults for any reason, the technology of the present invention considers other buyers on the list according to their ranking, until the impression is eventually filled. By this, the new SSP eliminates the impression waste and optimizes the yield by always fostering competition between the network and RTB demand.

The enhanced features of the new improved SSP include tools for insuring advertisement quality. Publishers expect high quality advertisement experiences for their readers. The new SSP provides tools augmented by the automated process to maintain high standards. Some of the features associated with these tools may include: 1) proactive filtering by brand, buyer, category, industry, ad type, and other criteria; 2) review and block creatives proactively within the account; 3) identify and request ad removal via a browser plug-in and reporting; 4) automated malware protection via proprietary algorithms and third-party solutions; 5) reporting and insights with expansive suite of reports that provide trends and actionable insights to help make informed decisions to increase performance. Some of the features associated with this are 1) access to diverse reports that pull data for yield, bid landscape & details, impressions (projected and reported), revenue, CPM, and inventory performance; 2) set and schedule monitoring, alerts and real-time actions on discrepancy, fill rate, yield and bid landscape; and 3) configure reports based on attributes (e.g., ad unit, site) and metrics (e.g., reported impressions, projection impressions and revenue). The advantages of the new improved SSP lies in fusing demand with comprehensive and instant analytics of the Network and RTB demand schemes; chain rendering, which eliminates negative economic consequences of defaults and ad server hops; and use of browser technology that maximizes economics and improves latency through browser innovations. In addition, the new improved SSP views the network and RTB demand channels as a whole to award impressions to the highest bidder who meets advertisement quality requirements. This approach eliminates negative consequences of defaults and minimizes impression loss. It awards impressions based on a true CPM algorithm (looks at CPM in conjunction with default rate) and it offers a true 100% yield-driven solution (not just about impression fill).

In the following description, for purposes of explanation, numerous specific details are set forth in order to provide a thorough understanding of this technology. It will be apparent, however, that this technology can be practiced without some of these specific details. In other instances, structures and devices are shown in block diagram form in order to avoid obscuring the innovative aspects. For example, the present technology is described in some implementations below with reference to particular hardware and software.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus for performing the operations described. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present technology can take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times, code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

Each computer in the system may include one or more input and output (I/O) unit, a memory system, and one or more processing units. The input-output ("I/O") units of each computer may be connected to various input/output devices, such as a mouse, keyboard, video card (video monitor), sound card (with speakers), network card, and printer. The memory system in a typical general purpose computer system usually includes a computer readable and writeable nonvolatile recording medium, of which a magnetic disk, a flash memory and tape are examples. The memory system operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

System Overview

FIG. 1 illustrates a block diagram of an example architecture including improved systems for deterministically rendering defaulting advertisement chains and implementing demand fusion and predictive pricing technologies in an example environment 100 in which the present systems and methods are operable. The example system includes at least a supply-side platform ("SSP") configured with enhanced features and functionalities for deterministically rendering defaulting advertisement chains and implementing demand fusion and predictive pricing mechanisms. The supply-side platform is referenced by reference numeral 108. A demand-side platform 130 is also illustrated. It should be recognized that although the platforms are illustrated separately, various functionalities may be integrated. Corresponding scripts that enable these enhanced features and functionalities are provided to or are otherwise resident in client or user devices 115a through 115n. As illustrated, in some examples of the present technologies, a script 122a (or through 122n) for deterministically rendering defaulting advertisement chains is placed in a user, consumer, or client device 115a . . . 115n. The environment 100 includes an advertiser(s) server or site 102 (representing one or more online advertisers), a publisher(s) content server or site 104 (representing one or more online publishers), a network 106 (e.g., an advertisement ("ad") network), a SSP platform configured for deterministically rendering defaulting advertisement chains, demand fusion, and predictive pricing (also referred to herein as platform 108), an advertisement server 110, and a real-time bid market system/ad exchange system 107 and user devices 115a . . . 115n (also individually and collectively herein referred to as 115). The user devices 115a . . . 115n include web browsers or mobile applications 120a . . . 120n (also individually and collectively herein referred to as 120) and various scripts. In some implementations, the user devices 115a-115n, have a script for deterministically rendering defaulting advertisement chains 122a . . . 122n, a script for implementing demand fusion 125a . . . 125n, and a script for predictive pricing 127a . . . 127n.

The advertiser server 102 may be an online or digital advertiser server or website 102 (representing one or more online or digital advertisers). In the context of the present disclosure, an advertiser is any individual, group of people, company, or any other enterprise, that desires to have advertisements embedded in the content of other publishers. The online or digital advertiser server 102 may be a computing system (of one or more computers or processors, either linked or distributed) that submits bids to the RTB market platform 107 (shown in broken lines) to purchase publisher inventory and have advertiser advertisements shown on the publisher's website or mobile application. The online or digital advertiser server 102 is illustrated as coupled to the RTB market platform 107 via signal line 111 and the online or digital publisher content server 104 is illustrated as coupled to the RTB market platform 108 via line 113. In accordance with the present innovations, the advertise server 102 may submit requests to the SSP platform 108 to purchase publisher inventory and to display advertisements from particular advertisers on the publishers' sites or applications. In some embodiments, the computing system may comprise one or more processors coupled in a distributed environment or otherwise to execute the functionalities of the SSP platform 108.

The online or digital publisher content server 104 may be a computing system that maintains online or digital content that attracts users and contains placeholders for ads (from the ad inventory) that are submitted to the RTB market, for sale to advertisers. A content publisher that places content on publisher content server 104 may be an individual, a group of people, a company, or any other enterprise that owns or controls content that is made accessible for viewing via the publisher content server 104. A content publisher utilizes the publisher content server to serve content (e.g., web pages) to the user devices 115a through 115n of an Internet or application user. For instance, in some embodiments, the publisher content server 104 is a web server or application server that serves Internet documents or web pages encoded in a mark-up language (e.g., HTML) that can be rendered by the web browser (or mobile application) 120a through 120n application executing at a user device 115a through 115n, for display to an Internet user. Accordingly, the web pages served by the publisher server 104 may be thought of as the publisher's inventory. Each time a web page is served, an opportunity exists to display one or more advertisements embedded within the web page. Skilled artisans generally refer to this opportunity, that is, the presentation of a web page with a display advertisement, as a page impression, or simply an impression. Accordingly, the terms "ad space" and "impression" are often used synonymously with the term "inventory" to indicate what it is that is being offered for sale or viewing by the publisher. The online or digital publisher content server 104 has access to data provided by the SSP platform 108, either directly or otherwise, for example, predictive pricing components etc.

The RTB 107 may be a computing system that provides a real-time bidding market that allows advertisers to bid on publisher inventory in real-time. While only a single advertiser server 102, a single publisher content server 104 and a single network 106 are shown in FIG. 1, it should be recognized that there may be thousands or even millions of advertiser servers 102, publisher content servers 104, or networks 106 may be interconnected to execute the operations described here. FIG. 1 is merely provided as one example illustration of the systems 102, 104, and 106, which present the environment in which the present technology may be implemented.

The advertiser server 102 is coupled by signal line 111 for communication with the real-time bidding market 108. Although not explicitly shown in FIG. 1, it should be recognized that any and all the signal lines illustrated in FIG. 1 may route, via the network 106, as illustrated in FIG. 1. The advertiser 102 is coupled to the real-time bidding market 107 to send bids on impressions, and also provides advertisement content, advertising target information, price, or any other information related to the impression or necessary to serve the ad. The RTB market platform 107 illustrates a real-time bidding market, which allows advertisers to bid on publisher inventory in real-time.

The online publisher content site or server 104 is a computing device for hosting a website with any type of content for publishing. The signal line 113 provides information to the RTB 107 about which impressions on the publisher's site are available for the RTB market. The bi-directional signal lines 113 (from the RTB 107) and 114 (from the SSP platform) indicate that data and other analytics may be provided directly to the publishers for future use by them.

The SSP platform 108 may be a computing system that aggregates inventory (e.g., premium inventory and remnant inventory) information from the publisher server 104 and provides the inventory information to the advertiser server 102 for advertisers to purchase impressions and/or inventories to post their advertisements. Although only a single advertiser server 102, a single publisher server 104 and a single network 106 are shown in FIG. 1, it should be recognized that there may be thousands or even millions of advertiser servers 102, publisher server 104, or networks 106. FIG. 1 is merely provided for purposes of illustration of the systems 102, 104, 106, 108, 110, and 115 including 120 and 122, which present the environment in which the present technology can be implemented.

The advertiser server 102 is coupled by signal line 112 for communication with the SSP platform 108. The advertiser server 102 is coupled to the SSP platform 108 to provide advertisement content, advertising target information, price, or any other information related to the impression or necessary to serve the ad. The online publisher server 104 is a computing device for hosting a website with any type of content for publishing. The signal line 114 provides information to the SSP platform 108 about which impressions on the publisher's site are available for purchase and/or requires filling.

The network 106 is a conventional type, wired or wireless, and may have any number of configurations such as a star configuration, token ring configuration or other configurations known to those skilled in the art. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The SSP platform 108 is coupled by signal line 118 to an advertisement server 110, which is configured to serve the advertisements. The advertisement server 110 may be hardware and software that receives requests for advertisement units, submits, and then fulfills those requests with online content. The advertisement server 110 is coupled to the network 106 for communication and interaction with the advertiser server 102 and/or the publisher server 104. In some embodiments, the advertisement server 110 is also coupled to interact directly with the user devices 115a . . . 115n as depicted in FIG. 1, by signals lines 126a (connecting the advertisement server 110 to the user device 115a) through 126n (connecting the advertisement server 110 to the user device 115n).

The client (alternatively referred to as a consumer, user, or viewer) device 115a is representative of client devices 115a-115n and is a conventional type of computing device, for example, a personal computer, a hardware server, a laptop computer, a tablet computer, or smart phone. The client devices 115a-115n, are illustrated, as coupled to the network 106. In one embodiment, the client device 115 (e.g., 115a) is coupled to receive online advertisements from the advertisement server 110 directly and/or receive content from publishing sites such as the publisher server 104 via the network 106. The client device 115 (e.g., 115a) includes a web browser (or mobile application) 120a for presenting online content and advertisements to a user (not shown) using any of the user devices 115a through 115n. The web browser (or mobile application) 120a is configured to provide access to a hosted web page. The web page may comprise a main area in which content is displayed and an advertisement. In some instances, the advertisement may be contained within an iframe.

As illustrated in the figure, the web browser (or mobile application) 120a may include scripts configured to perform the functionalities with the SSP platform. In some implementations, a script configured to deterministically render defaulting advertisement chains 122a through 122n (also referred to herein as script 122) is located in the browser (or mobile application) 120a through 120n. The script 122 may be configured to deterministically render an advertisement impression (i.e., publisher's inventory) from a list of possibly defaulting ads (received or obtained from the advertisement server 110) in a JavaScript-enabled web browser (e.g., the web browser/mobile application 120a through 120n).

Figure 4:
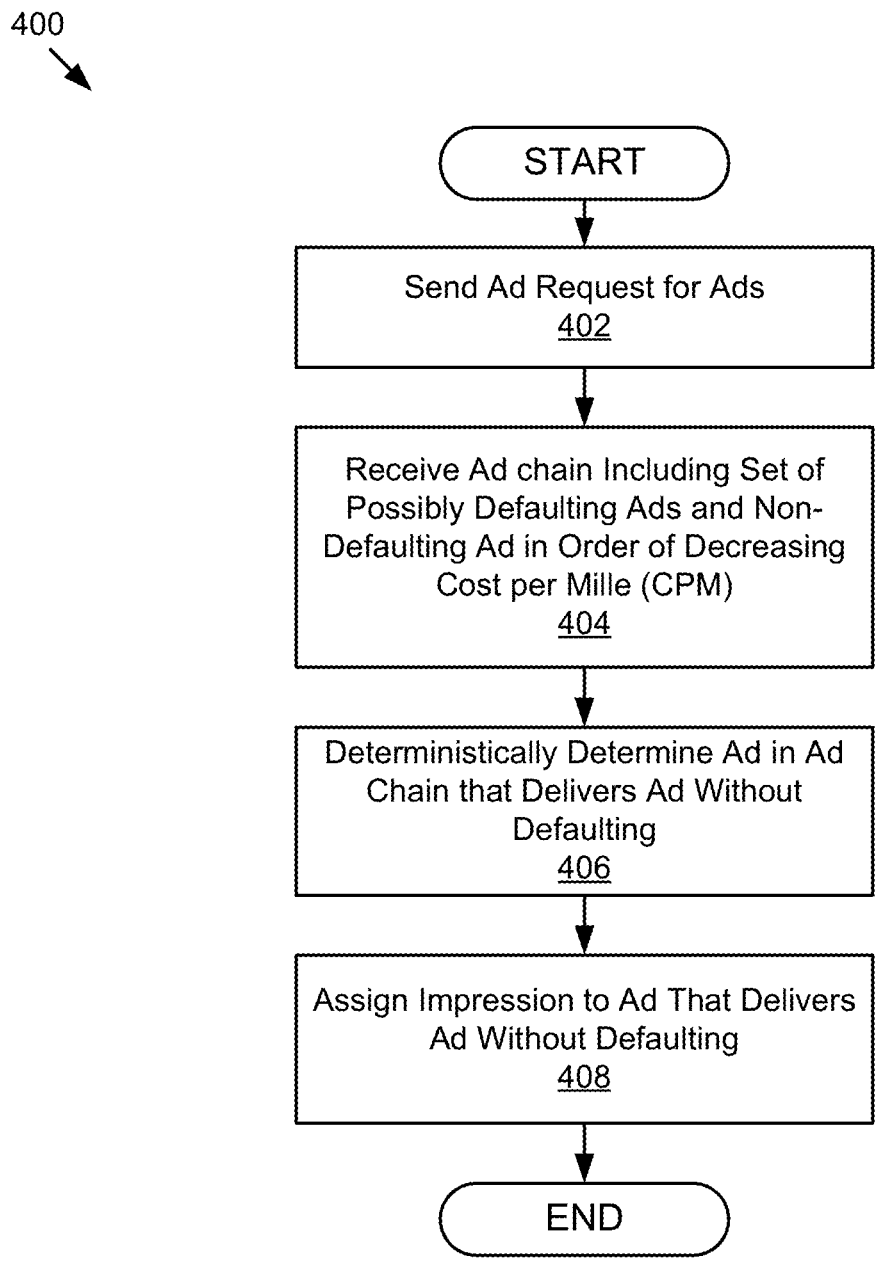
FIG. 4 is a flow chart of a general method for deterministically determining a non-defaulting ad in an ad chain and assigning an impression to that ad.
Figure 5A:
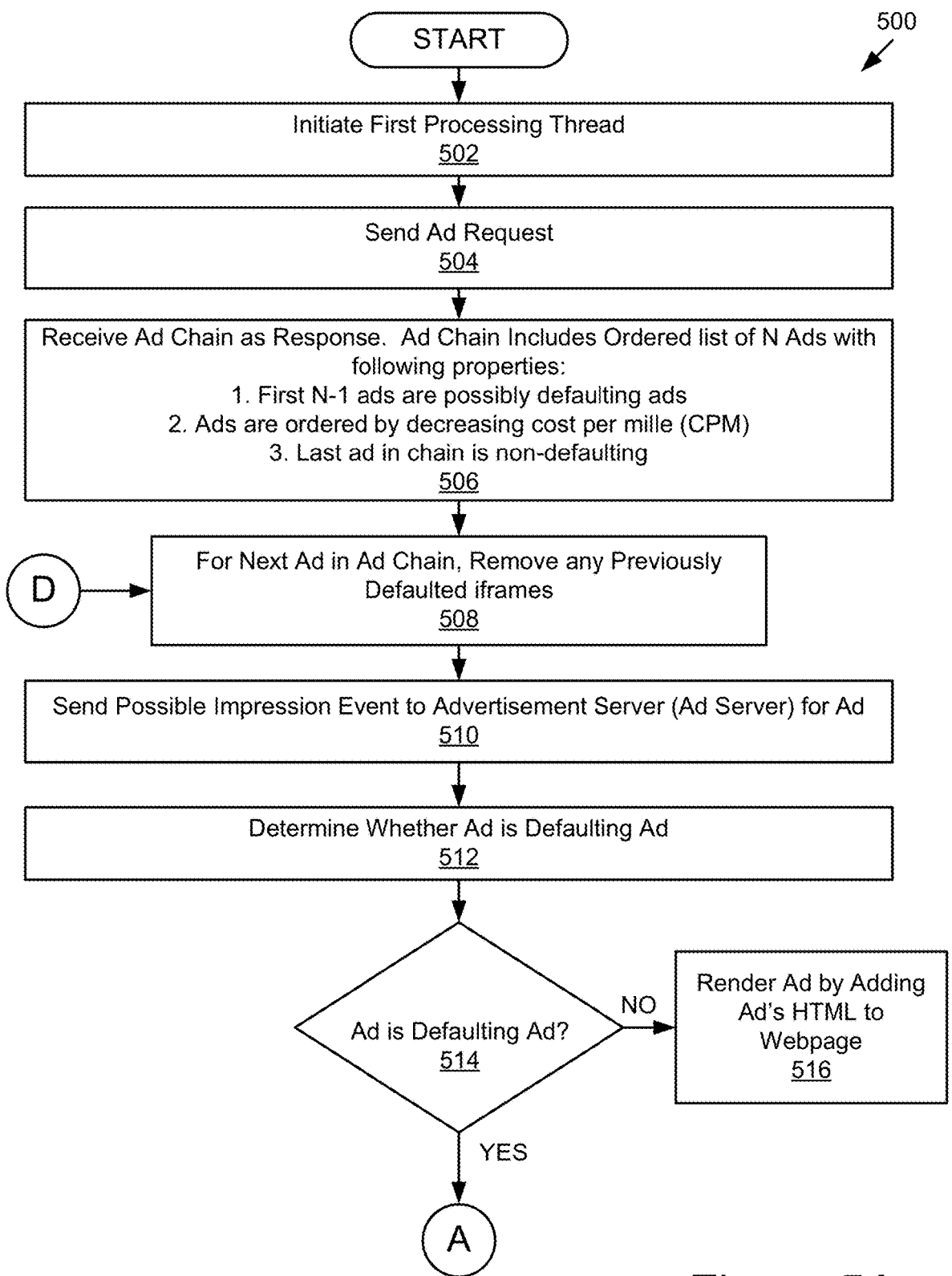
FIGS. 5A through 5D illustrate flowcharts of a specific method for deterministically determining a non-defaulting ad in an ad chain and assigning an impression to that ad.
Figure 5B:
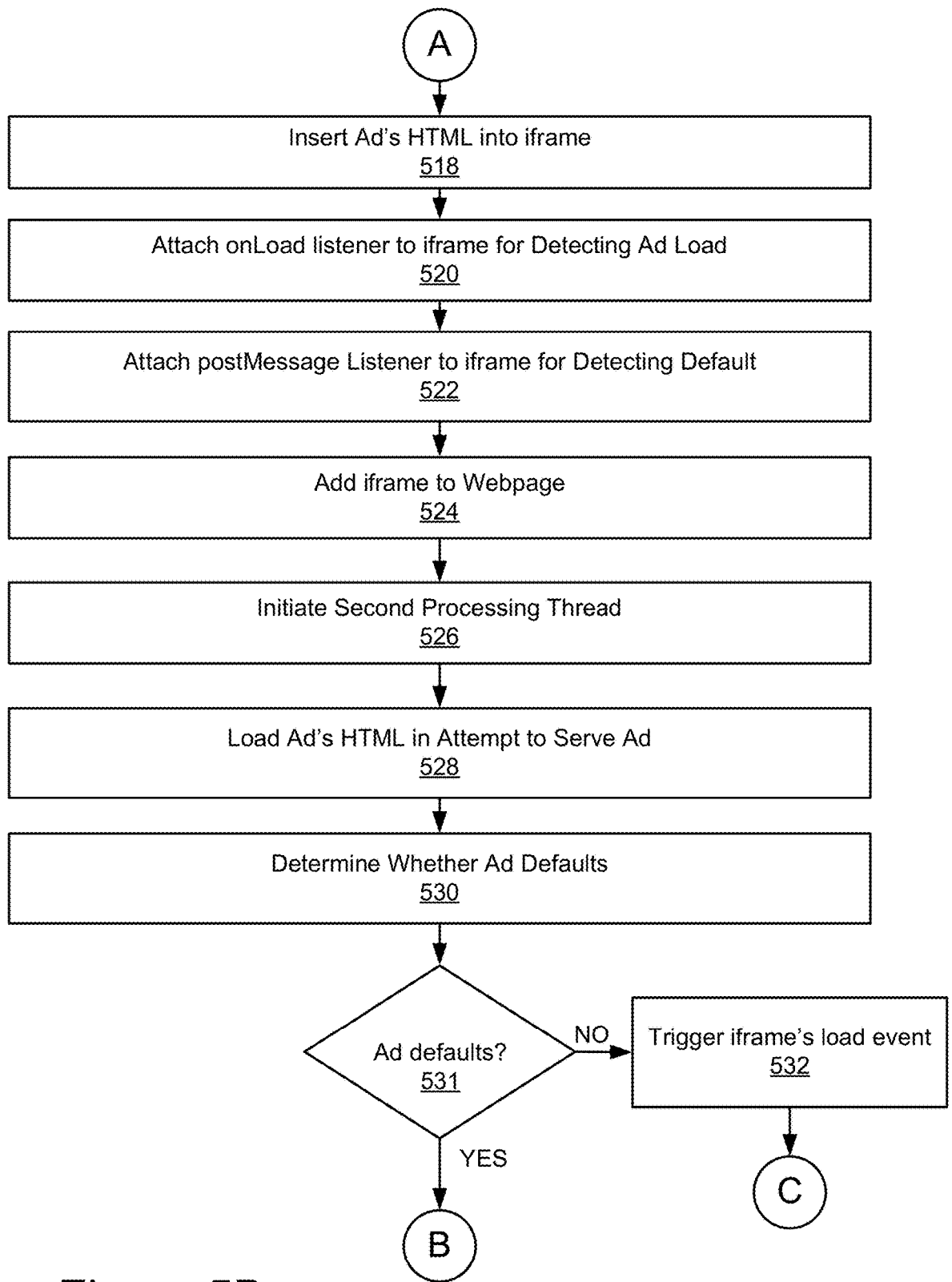
Figure 5C:
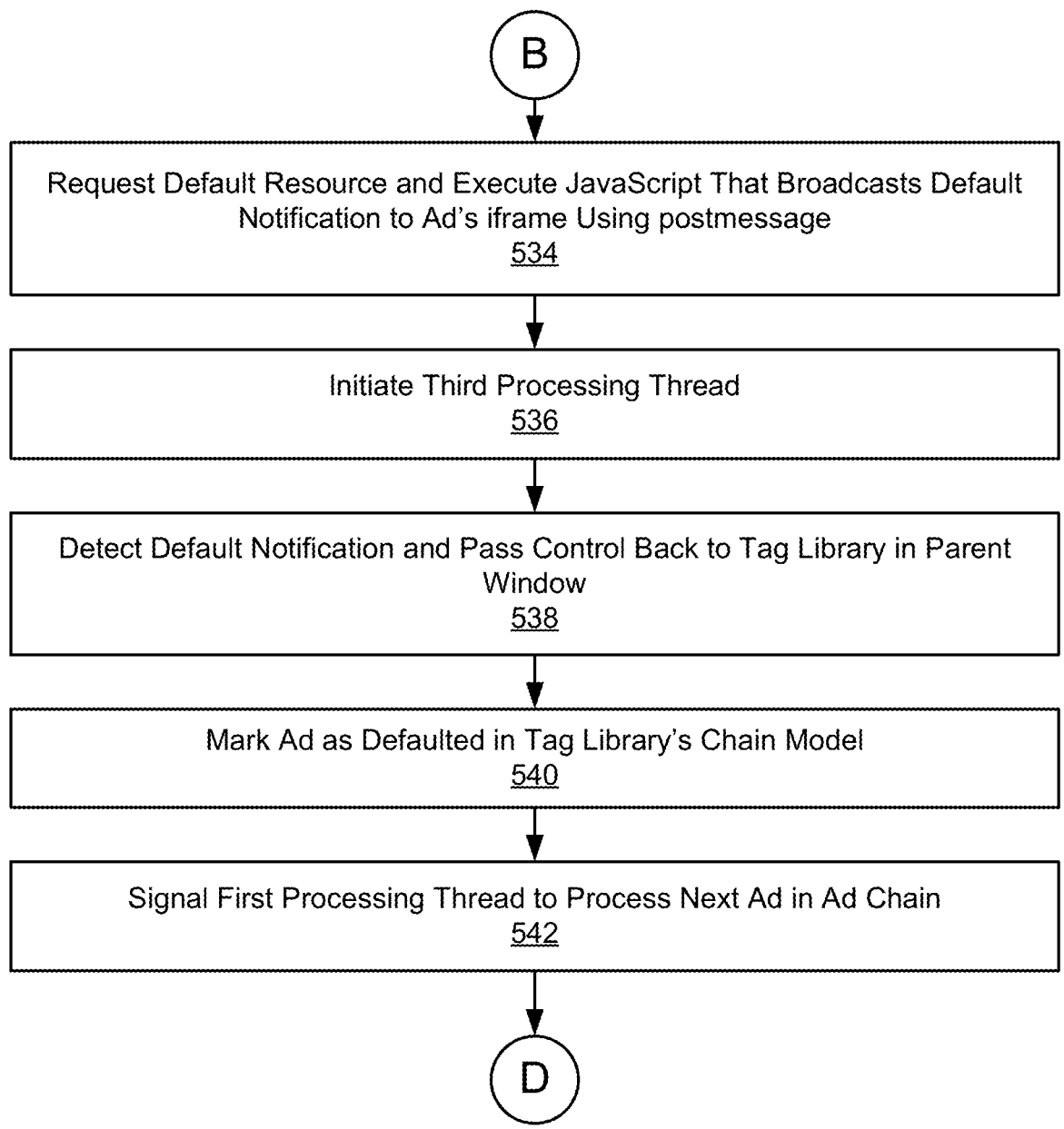

In some implementations, the script 122 (any of 122a through 122n) may be installed and/or provided by the SSP platform 108 to perform its respective functionality in the web browser 120. Detailed description of the script 122 (122a through 122n) is presented below with reference to algorithms for deterministic rendering of defaulting ad chains as illustrated in FIGS. 4 through 5C.

In some implementations, in a real-time scenario, the RTB market platform 107 is coupled by signal line 117 to an advertisement server 110, which serves ads. Advertisers participating in the RTB market send their bids and ad tags simultaneously as they bid. Advertisers who use ad consoles typically preload their ad code and the ads corresponding to the ad code are served from the ad server 110. In some implementations, the ad server 110 is software that receives requests for ad units, submits, and then fulfills those requests with online or digital content. The advertisement server 110 is coupled to the network 106 for communication and interaction with online or digital advertisers 102 and the online or digital publisher content site 104. A user who is browsing the web on the user device (115*a* through 115*n*) is a potential customer for viewing advertisements. There may be any number of users who are coupled via the network 106 to online or digital publisher sites 104. For example, when a user navigates to a web page or mobile application that is supplied by an online or digital publishing content site 104, requests are sent to the online or digital publishing content site 104 (the publisher's server) for content. The user (via any of the user device 115*a* through 115*n*) navigates to a web page via a web browser 120. The browser may be any one of Chrome, Safari, Firefox, Internet explorer or the like.

The online or digital publishing content site 104 (publisher) serves up the content, which includes executable javascript tags. Once these tags are loaded in the user's web browser 120 (via lines 124*a* through 124*n*, routed through the network 106), they are executed and notify the ad server 110 that there is an impression that needs filling. The impression is then submitted to the Real-Time Bidding (RTB) market platform 107, where advertisers may bid to fill the impression with their advertisements. The RTB market platform 107 may apply market floors, provided either by publishers or the market operator, for each of the competing advertisers and may use these market floors, along with the advertiser bids, to determine the winner of the auction and their clearing price. In the event that all of the received bids are too low, the Auction may not clear. The operations of the RTB market platform 107 are described to present the entire scenario, yet as illustrated by the broken lines, these operations may be used any or all of the features and functionalities of the SSP platform 108.

The RTB market platform 107 implements a real-time bidding market. In the implementations described here, the RTB market platform 107 conducts a market floor auction for ad placement, which is a specialized auction that determines an auction winner, auction clearing price based on the bids submitted by advertisers, and per-advertiser market floors that are calculated and distributed by the market floor system 100. In some implementations, an auction event store (not shown) may include a large collection of computers arranged in a distributed, computational, and storage grid. The auction event store may store events from the Advertisement server 110 and RTB market platform 107. A market floor engine may be configured to determine and provide market floor prices, which may in some instances be dynamically or selectively set by publishers. In some implementations, the market floor engine may be an analytics engine that processes auction event data in either real-time, near-real-time, or batch mode, determines market floors based on this data, and assesses the revenue impact of using these market floors compared to publisher "static" floors and/or other benchmarks. The publisher may determine market floors by deriving data from the SSP platform 108.

The SSP platform 108 may be directly coupled to either market buyer or user devices 115*a* through 115*n*, through network 106, or an agency (now shown), to directly provide data and revenue value to any of these entities.

During an RTB auction, the advertisement server 110 and RTB market platform 107 may generate a number of events that include information about the context in which the RTB auction is occurring. An "event profile" (with the type of information available in the auction bids that are received) may be generated when all of the bids from the advertisers in an RTB auction have been received. An auction event store (FIG. 7) may store information available in the "auction complete" event generated when an auction has completed. The auction event store may include a large collection of computers arranged in a distributed, computational, and storage grid. The auction event store in some implementations stores events from the advertisement server 110, the RTB market system 107, and the SSP platform.

Figure 2A:
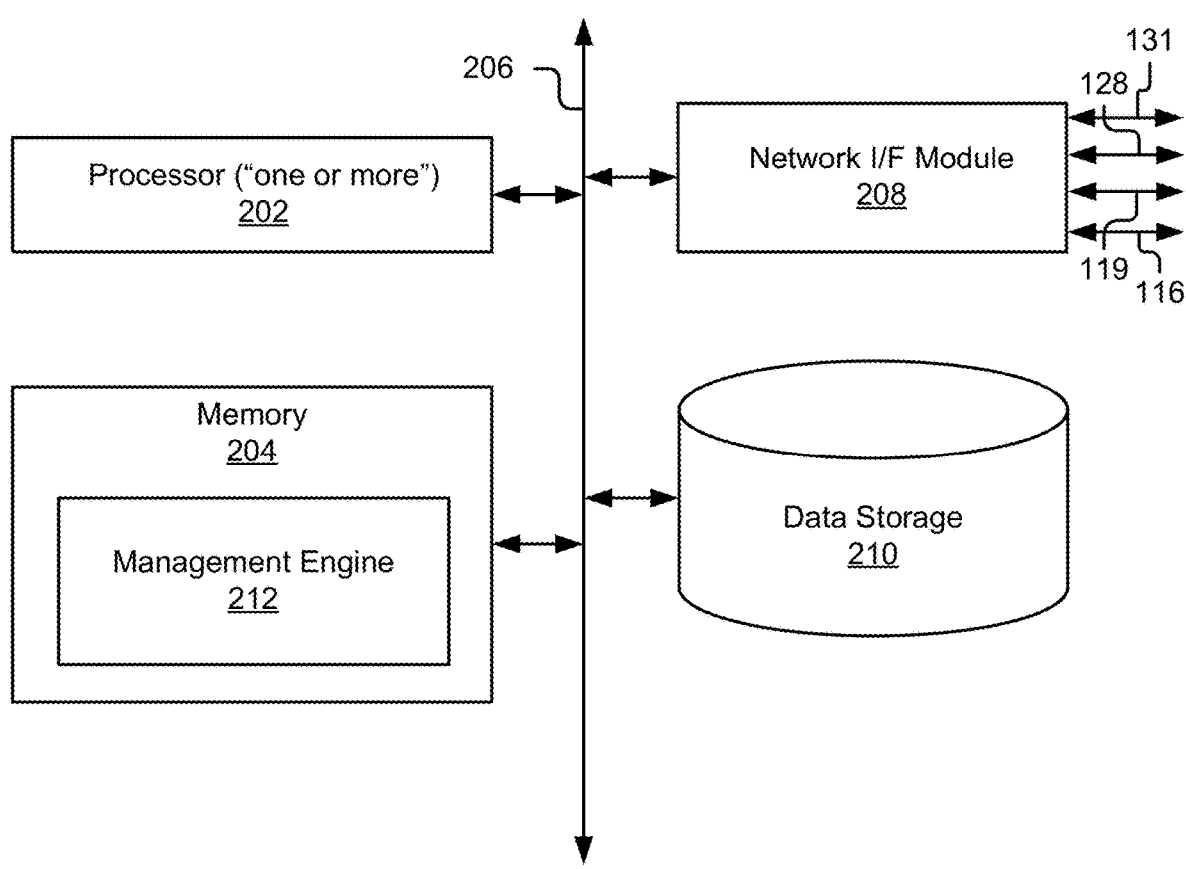
FIG. 2A is a block diagram of an example Supply-side platform ("SSP") or advertisement server with the enhanced functionalities for deterministically rendering defaulting advertisement chains.

Referring now to FIG. 2A, the Supply-Side Platform ("SSP") 108 and or the Advertisement Server 110 may include one or more processors 202, a memory 204 with a SSP Platform Engine, a network I/F module 208 and storage 210. The processor 202 processes data signals and program instruction received from the memory 204. The processor 202 may comprise various computing architectures including a complex instruction set computer (CISC) architecture, a reduced instruction set computer (RISC) architecture, or an architecture implementing a combination of instruction sets.

The memory 204 is non-transitory storage medium. The memory 204 stores the instructions and/or data which may be executed by the processor 202. In some embodiments, the instructions and/or data stored on the memory 204 comprises code for performing any and/or all of the techniques described herein. The memory 204 may be a dynamic random access memory (DRAM) device, a static random access memory (SRAM) device, flash memory or some other memory device known in the art. The memory 204 includes a management engine 212 for implementing the enhanced features.

The network I/F module 208 facilitates the communications between the SSP platform, the DFP platform 130, the RTB market/Ad Exchange system 107 and the advertiser server 110 and the Ad network 106, via signal lines 131, 128, 119, and 116, respectively. The SSP platform 108 and the Advertisement server 110 communicate with the other components including the processor 202, memory 204, and storage 210 over the bus 206.

The data storage 210 stores the data and program instructions that may be executed by the processor 202. In some embodiments, the data storage 210 includes a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art.

Figure 2B:
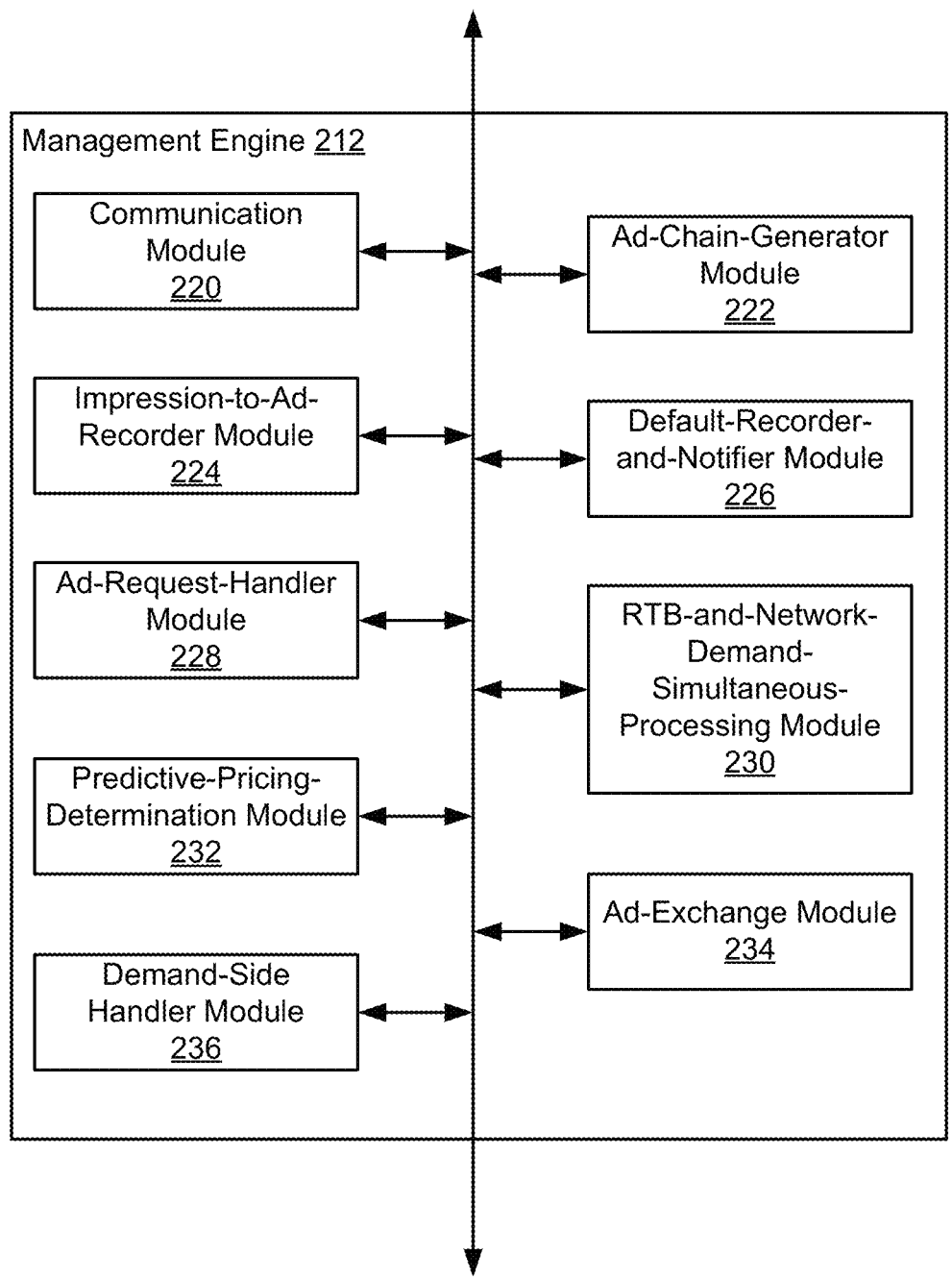
FIG. 2B is a block diagram of an example supply-side engine used in the Supply-side platform.

Referring now to FIG. 2B, the Management Engine 212 includes a communication module 220, an Ad-Chain Generator module 222, an Impression-to Ad-Recorder module 224, and a Default-Recorder-and-Notifier module 226, and Ad Request Handler module 228, and RTB-and-Network-Demand-Simultaneous processing module 230, a predictive pricing determination module 232, and ad exchange module 234, and a demand side handler module 236. The communication module 220 facilitates and manages the communications by the Management Engine 212. In some implementations, the communication module 220 may be software including routines for facilitating communications. In some implementations, the communication module 220 may be a set of instructions executable by the processor 202 to provide the functionality for generating and managing communications. In other implementations, the communication module 220 may be stored in the memory 204 (FIG. 2A) and may be accessible and executable by the processor 202 (FIG. 2A). In either implementation, communication module 220 may be adapted for cooperation and communication with the processor 202, data storage 210 and other components of the SSP platform and/or the advertisement server 110 via the bus 206.

The Ad-Chain generator 222 renders a chain of advertisements as described in FIGS. 4 through 6 below. In some implementations, the Ad-Chain generator 222 may be software including routines for rendering a chain of advertisements. In some implementations, the Ad-Chain generator 222 may be a set of instructions executable by the processor 202 (FIG. 2A) to provide the functionality for rendering a chain of advertisements. In other implementations, the Ad-Chain generator 222 may be stored in the memory 204 (FIG. 2A) and may be accessible and executable by the processor 202 (FIG. 2A). In either implementation, Ad-Chain generator 222 may be adapted for cooperation and communication with the processor 202, data storage 210 and other components of the SSP platform and/or the advertisement server 110 via the bus 206 (FIG. 2A).

The Impression-to-Ad Recorder 224 assigns an impression to an advertisement as described in FIGS. 4 through 6 below. In some implementations, the Impression-to-Ad Recorder 224 may be software including routines for assigning an impression to an advertisement. In some implementations, the Impression-to-Ad Recorder 224 may be a set of instructions executable by the processor 202 (FIG. 2A) to provide the functionality for assigning an impression to an advertisement. In other implementations, the Impression-to-Ad Recorder 224 may be stored in the memory 204 (FIG. 2A) and may be accessible and executable by the processor 202 (FIG. 2A). In either implementation, Impression-to-Ad Recorder 224 may be adapted for cooperation and communication with the processor 202, data storage 210 and other components of the SSP platform and/or the advertisement server 110 via the bus 206 (FIG. 2A).

The Default Recorder and Notifier 226 records and notifies of a default as described in the flow charts illustrated FIGS. 4 through 6 below. In some implementations, the Default Recorder and Notifier 226 may be software including routines for recording and notifying of a default. In some implementations, the Default Recorder and Notifier 226 may be a set of instructions executable by the processor 202 (FIG. 2A) to provide the functionality for recording and notifying of a default. In other implementations, the Default Recorder and Notifier 226 may be stored in the memory 204 (FIG. 2A) and may be accessible and executable by the processor 202 (FIG. 2A). In either implementation, Default Recorder and Notifier 226 may be adapted for cooperation and communication with the processor 202, data storage 210 and other components of the SSP platform and/or the advertisement server 110 via the bus 206 (FIG. 2A).

The Ad Request Handler module 228 receives Ad requests as described in the flow charts illustrated FIGS. 4 through 6 below. In some implementations, the Ad Request Handler module 228 may be software including routines handling ad requests. In some implementations, the Ad Request Handler module 228 may be a set of instructions executable by the processor 202 (FIG. 2A) to provide the functionality for handling ad requests. In other implementations, the Ad Request Handler module 228 may be stored in the memory 204 (FIG. 2A) and may be accessible and executable by the processor 202 (FIG. 2A). In either implementation, the Ad Request Handler module 228 may be adapted for cooperation and communication with the processor 202, data storage 210 and other components of the SSP platform and/or the advertisement server 110 via the bus 206 (FIG. 2A).

The RTB-and-Network-Demand-Simultaneous Processing module 230 fuses all the RTB and Network demand channels as described in the flow charts illustrated FIGS. 4 through 7 below. In some implementations, the RTB-and-Network-Demand-Simultaneous Processing module 230 may be software including routines for fusing the demand channels with the network demand channels. In some implementations, the RTB-and-Network-Demand-Simultaneous Processing module 230 may be a set of instructions executable by the processor 202 (FIG. 2A) to provide the functionality for fusing all the demand and network channels. In other implementations, the RTB-and-Network-Demand-Simultaneous Processing module 230 may be stored in the memory 204 (FIG. 2A) and may be accessible and executable by the processor 202 (FIG. 2A). In either implementation, the RTB-and-Network-Demand-Simultaneous Processing module 230 may be adapted for cooperation and communication with the processor 202, data storage 210 and other components of the SSP platform and/or the advertisement server 110 via the bus 206 (FIG. 2A).

The predictive pricing determination module 232 may be configured to predict pricing based on consideration of historical data as described in the flow charts illustrated in FIGS. 4 through 7 below. In some implementations, the predictive pricing determination module may be software including routines predicting prices based on historical data. In some implementations, the predictive pricing determination module 232 may be a set of instructions executable by the processor 202 (FIG. 2A) to provide the functionality for predicting prices. In other implementations, the predictive pricing determination module 232 may be stored in the memory 204 (FIG. 2A) and may be accessible and executable by the processor 202 (FIG. 2A). In either implementation, the predictive pricing determination module 232 may be adapted for cooperation and communication with the processor 202, data storage 210 and other components of the SSP platform and/or the advertisement server 110 via the bus 206 (FIG. 2A).

The Ad Exchange module 234 determines optimum pricing (first and second pricing) as described in the flow charts illustrated in FIGS. 4 through 7 below. In some implementations, the Ad Exchange module 234 may be software including routines for determining optimum pricing. In some implementations, the ad exchange module 234 may be a set of instructions executable by the processor 202 (FIG. 2A) to provide the functionality for handling ad requests. In other implementations, the Ad Exchange module 234 may be stored in the memory 204 (FIG. 2A) and may be accessible and executable by the processor 202 (FIG. 2A). In either implementation, the Ad exchange module 234 may be adapted for cooperation and communication with the processor 202, data storage 210 and other components of the SSP platform and/or the advertisement server 110 via the bus 206 (FIG. 2A).

The demand side handler module 236 determines the demand market scenarios as described in the flow charts illustrated FIGS. 4 through 7 below. In some implementations, the demand side handler module 236 may be software including routines for determining the demand market scenarios. In some implementations, the demand side handler module 236 may be a set of instructions executable by the processor 202 (FIG. 2A) to provide the functionality for determining the number of demand channels. In other implementations, the demand side handler module 236 may be stored in the memory 204 (FIG. 2A) and may be accessible and executable by the processor 202 (FIG. 2A). In either implementation, the demand side handler module 236 may be adapted for cooperation and communication with the processor 202, data storage 210 and other components of the SSP platform and/or the advertisement server 110 via the bus 206 (FIG. 2A).

Figure 3A:
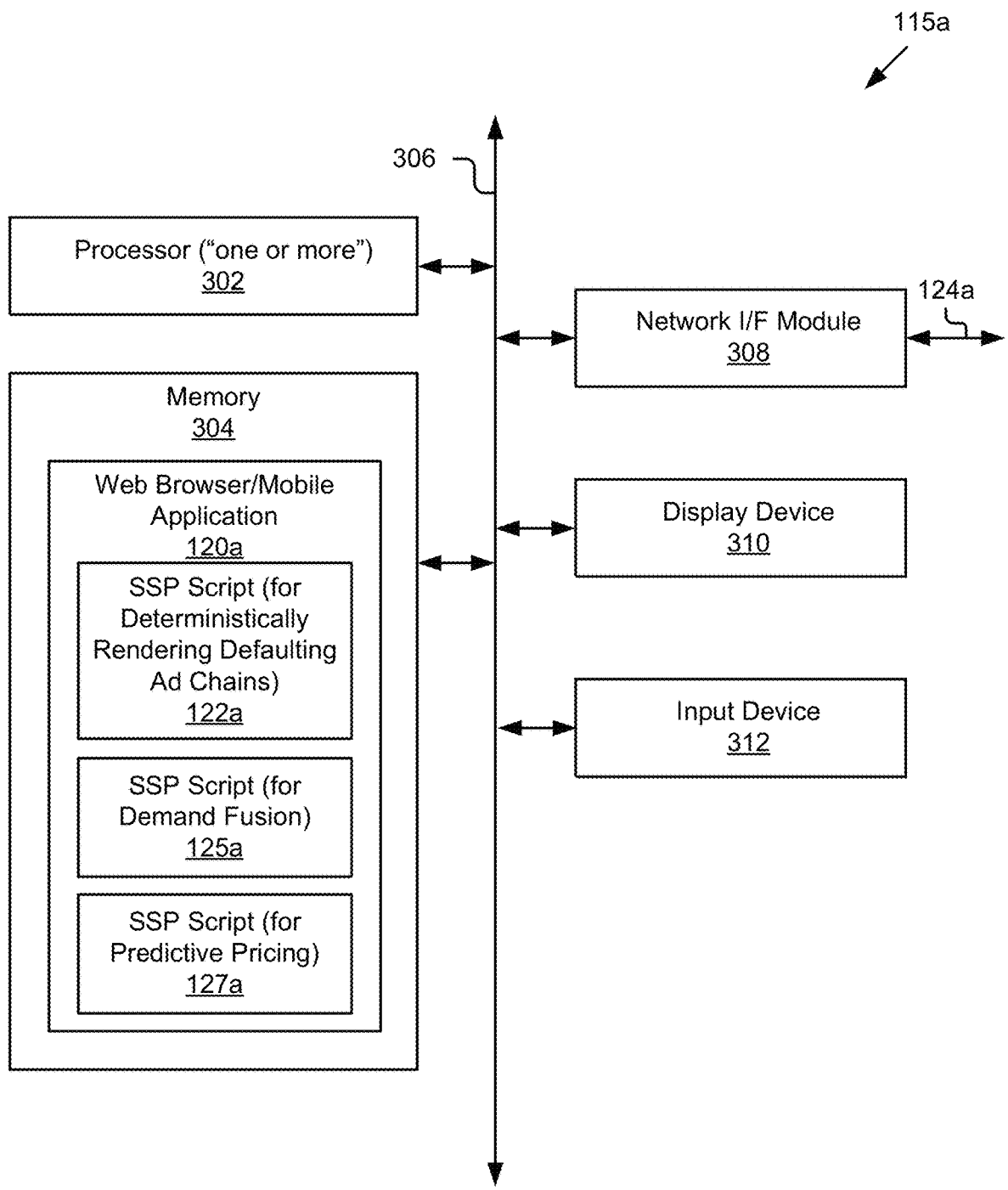
FIG. 3A is a block diagram of an example user device as illustrated in FIG. 1.

Referring now to FIG. 3A, the user device (any of 115a through 115n) may be a conventional computer, for example, a personal computer that is used to represent a conventional type of mobile computing device, for example, cellular telephones, tablet devices, or wearable devices, each using a computing device or a computing device connected to an actual mobile device. The user devices 115a-115n, are coupled to the network 106 (e.g., an ad network) by signal lines 124a-124n, respectively. In one embodiment, the user device 115a is coupled to receive (e.g., download or otherwise view) content with online advertisements from the advertisement server 102 and other content from publishing sites or third party servers (not shown) but coupled in the illustrated distributed environment. The user device 115a through 115n includes the web browser/mobile application 120a for presenting web pages including online content and advertisements to the user, consumer, or client for viewing on their respective user devices 115a-115n. The web browser/mobile application 120a on each of the user devices 115a-115n presents advertisements and other online content, and receives input from the user as represented by signal lines 124a-n. Users may interact via their respective devices 115a-115n (e.g., for viewing or manipulating tools to receive or control viewing of the online content). The web browser/mobile application 120a-n and the scripts resident on the user devices 115a-115n are operable on the user devices 115a through 115n. In some implementations, the scripts may include a script for deterministically rendering defaulting advertisement chains, indicated by reference numeral 122a and a script for SSP demand fusion 125a.

The user device 115a through 115n may comprise a processor or one or more processors, indicated by reference numeral 302, a memory 304, a network I/F module 308, a display device 310, and an input device 312. The processor 302 processes data signals and program instruction received from the memory 304. The processor 302 may comprise various computing architectures including a complex instruction set computer (CISC) architecture, a reduced instruction set computer (RISC) architecture, or an architecture implementing a combination of instruction sets.

The memory 304 is non-transitory storage medium. The memory 304 stores the instructions and/or data which may be executed by the processor 302. In some embodiments, the instructions and/or data stored on the memory 304 comprises code for performing any and/or all of the techniques described herein. The memory 304 may be a dynamic random access memory (DRAM) device, a static random access memory (SRAM) device, flash memory or some other memory device known in the art. The memory 304 includes the web browser/mobile application 120a including various scripts that enhance the functionality of the SSP platform. In some implementations, the memory stores the web browser 120 with the SSP script for deterministically rendering defaulting advertisement chains indicated by reference numeral 122a. In some implementations, the memory 304 stores the web browser/mobile application 120a with the SSP script for implementing demand fusion as indicated by reference numeral 125a. In some implementations, the memory 304 stores the web browser/mobile application 120a with the SSP script for predictive pricing.

The network I/F module 308 facilitates the communication between the user device 115a and the servers via the network 106. A user, via the user device 115a, communicates with the other servers in the system 100 (FIG. 1) via the network I/F module 308.

The display device 310 displays the content or web pages that a particular user is viewing and the input device 312 serves as the input to the display device 210.

Figure 3B:
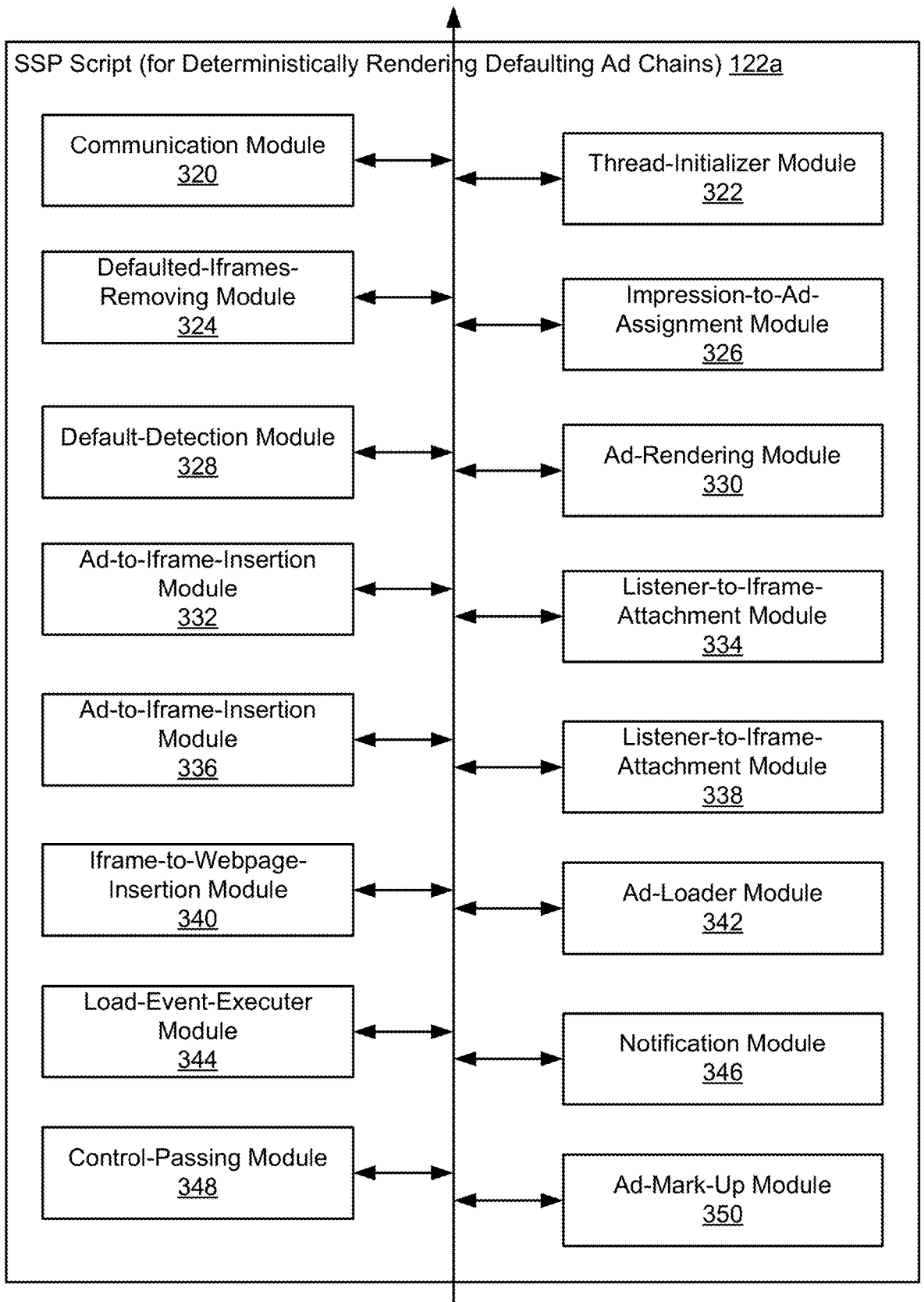
FIG. 3B is a block diagram of an example Supply-side platform ("SSP") script for deterministically rendering defaulting advertisement chains.

Referring now to FIG. 3B, the SSP script for deterministically rendering defaulting advertisement chains as indicated by reference numeral 122a may include various modules to accomplish the enhanced functionalities. In some implementations, the SSP script 122a comprises a communication module 320, a thread-initializer module 322, a defaulted-iframes-removing module 324, an impression-to-ad-assignment module 326, a default-detection Module 328, an ad-rendering module 330, an ad-to-iframe insertion module 332, a listener-to-iframe-attachment module 334, an ad-to-iframe-insertion module 336, a listener-to-iframe-attachment module 338, an iframe-to-webpage-insertion module 340, an ad-loader module 342, a load-event-executer module 344, a notification module 346, a control-passing module 348, and an ad-mark-up module 350.

The communication module 320 may be software including routines for facilitating communications with the SSP platform 108 and/or the Ad Server 110. In some implementations, the communication module 320 may be a set of instructions executable by the processor 302 to provide the functionalities described below in the flow charts (FIGS. 4 through 6) that provide the enhanced features. In other implementations, the communication module 320 may be stored in the memory 304 and may be accessible and executable by the processor 302. In either implementation, the communication module 320 may be adapted for cooperation and communication with the processor 302, the Network I/F module 308, the memory 304, the display device 310, and the input device 312 via the bus 306.

The thread-initializer module 320 may be software including routines for initializing each of the threads. In some implementations, the thread-initializer module 320 may be a set of instructions executable by the processor 302 to provide the functionalities described below in the flow charts (FIGS. 4 through 6) that facilitate initializing threads when deterministically rendering defaulting advertisement chains. In other implementations, the thread-initializer module 320 may be stored in the memory 304 and may be accessible and executable by the processor 302. In either implementation, the thread-initializer module 320 may be adapted for cooperation and communication with the processor 302, the Network I/F module 308, the memory 304, the display device 310, and the input device 312 via the bus 306.

The defaulted-iframes-removing module 324 may be software including routines for removing defaulted iframes. In some implementations, the defaulted-iframes-removing module 324 may be a set of instructions executable by the processor 302 to provide the functionalities described below in the flow charts (FIGS. 4 through 6) that facilitate removing defaulted iframes. In other implementations, the defaulted-iframes-removing module 324 may be stored in the memory 304 and may be accessible and executable by the processor 302. In either implementation, the defaulted-iframes-removing module 324 may be adapted for cooperation and communication with the processor 302, the Network I/F module 308, the memory 304, the display device 310, and the input device 312 via the bus 306.

The impression-to-ad-assignment module 326 may be software including routines for assigning an impression to an advertisement. In some implementations, the impressionto-ad-assignment module 326 may be a set of instructions executable by the processor 302 to provide the functionalities described below in the flow charts (FIGS. 4 through 6) that facilitate assigning impressions to advertisements. In other implementations, the impression-to-ad-assignment module 326 may be stored in the memory 304 and may be accessible and executable by the processor 302. In either implementation, the impression-to-ad-assignment module 326 may be adapted for cooperation and communication with the processor 302, the Network I/F module 308, the memory 304, the display device 310, and the input device 312 via the bus 306.

The default-detection module 328 may be software including routines for detecting a default. In some implementations, the default-detection module 328 may be a set of instructions executable by the processor 302 to provide the functionalities described below in the flow charts (FIGS. 4 through 6) that facilitate detecting defaults. In other implementations, the default-detection module 328 may be stored in the memory 304 and may be accessible and executable by the processor 302. In either implementation, the default-detection module 328 may be adapted for cooperation and communication with the processor 302, the Network I/F module 308, the memory 304, the display device 310, and the input device 312 via the bus 306.

The ad-rendering module 330 may be software including routines for rendering an advertisement from a chain. In some implementations, the ad-rendering module 330 may be a set of instructions executable by the processor 302 to provide the functionalities described below in the flow charts (FIGS. 4 through 6) that facilitate rendering an advertisement. In other implementations, the ad-rendering module 330 may be stored in the memory 304 and may be accessible and executable by the processor 302. In either implementation, the ad-rendering module 330 may be adapted for cooperation and communication with the processor 302, the Network I/F module 308, the memory 304, the display device 310, and the input device 312 via the bus 306.

The ad-to-iframe insertion module 332 may be software including routines for inserting an advertisement within an iframe. In some implementations, the ad-to-iframe insertion module 332 may be a set of instructions executable by the processor 302 to provide the functionalities described below in the flow charts (FIGS. 4 through 6) that facilitate inserting the advertisement within the iframe. In other implementations, the ad-to-iframe insertion module 332 may be stored in the memory 304 and may be accessible and executable by the processor 302. In either implementation, the ad-to-iframe insertion may be adapted for cooperation and communication with the processor 302, the Network I/F module 308, the memory 304, the display device 310, and the input device 312 via the bus 306.

The listener-to-iframe attachment module 334 may be software including routines for attaching the listener to the iframe. In some implementations, the listener-to-iframe attachment module 334 may be a set of instructions executable by the processor 302 to provide the functionalities described below in the flow charts (FIGS. 4 through 6) that facilitate attaching the listener to the iframe. In other implementations, the listener-to-iframe attachment module 334 may be stored in the memory 304 and may be accessible and executable by the processor 302. In either implementation, the listener-to-iframe attachment module 334 may be adapted for cooperation and communication with the processor 302, the Network I/F module 308, the memory 304, the display device 310, and the input device 312 via the bus 306.

An additional ad-to-iframe insertion module 336 and listener-to-iframe attachment module 338 are illustrated to indicate that more than one module to accomplish these functionalities may be included.

The iframe-to-webpage insertion module 340 may be software including routines for inserting the iframe to the webpage. In some implementations, the iframe-to-webpage insertion module 340 may be a set of instructions executable by the processor 302 to provide the functionalities described below in the flow charts (FIGS. 4 through 6) that facilitate inserting the iframe to the webpage. In other implementations, the iframe-to-webpage insertion module 340 may be stored in the memory 304 and may be accessible and executable by the processor 302. In either implementation, the iframe-to-webpage insertion module 340 may be adapted for cooperation and communication with the processor 302, the Network I/F module 308, the memory 304, the display device 310, and the input device 312 via the bus 306.

The ad-loader module 342 may be software including routines for loading the advertisements rendered in the chain. In some implementations, the ad-loader module 342 may be a set of instructions executable by the processor 302 to provide the functionalities described below in the flow charts (FIGS. 4 through 6) that facilitate loading the advertisements. In other implementations, the ad-loader module 342 may be stored in the memory 304 and may be accessible and executable by the processor 302. In either implementation, the ad-loader module 342 may be adapted for cooperation and communication with the processor 302, the Network I/F module 308, the memory 304, the display device 310, and the input device 312 via the bus 306.

The load-event executer module 344 may be software including routines for executing the load event. In some implementations, the load-event executer module 344 may be a set of instructions executable by the processor 302 to provide the functionalities described below in the flow charts (FIGS. 4 through 6) that facilitate executing the load events. In other implementations, load-event executer module 344 may be stored in the memory 304 and may be accessible and executable by the processor 302. In either implementation, the load-event executer module 344 may be adapted for cooperation and communication with the processor 302, the Network I/F module 308, the memory 304, the display device 310, and the input device 312 via the bus 306.

The notification module 346 may be software including routines for providing notifications. In some implementations, the notification module 346 may be a set of instructions executable by the processor 302 to provide the functionalities described below in the flow charts (FIGS. 4 through 6) that facilitate providing notifications. In other implementations, the notification module 346 may be stored in the memory 304 and may be accessible and executable by the processor 302. In either implementation, the notification module 346 may be adapted for cooperation and communication with the processor 302, the Network I/F module 308, the memory 304, the display device 310, and the input device 312 via the bus 306.

The control-passing module 348 may be software including routines for passing control. In some implementations, the control-passing module 348 may be a set of instructions executable by the processor 302 to provide the functionalities described below in the flow charts (FIGS. 4 through 6) that facilitate passing control. In other implementations, control-passing module 348 may be stored in the memory 304 and may be accessible and executable by the processor 302. In either implementation, the control-passing module 348 may be adapted for cooperation and communication with the processor 302, the Network I/F module 308, the memory 304, the display device 310, and the input device 312 via the bus 306.

The ad-mark-up module 350 may be software including routines for marking up the advertisement. In some implementations, the ad-mark-up module may be a set of instructions executable by the processor 302 to provide the functionalities described below in the flow charts (FIGS. 4 through 6) that facilitate marking up advertisement. In other implementations, ad-mark-up module 350 may be stored in the memory 304 and may be accessible and executable by the processor 302. In either implementation, the ad-mark-up module may be adapted for cooperation and communication with the processor 302, the Network I/F module 308, the memory 304, the display device 310, and the input device 312 via the bus 306.

Figure 3C:
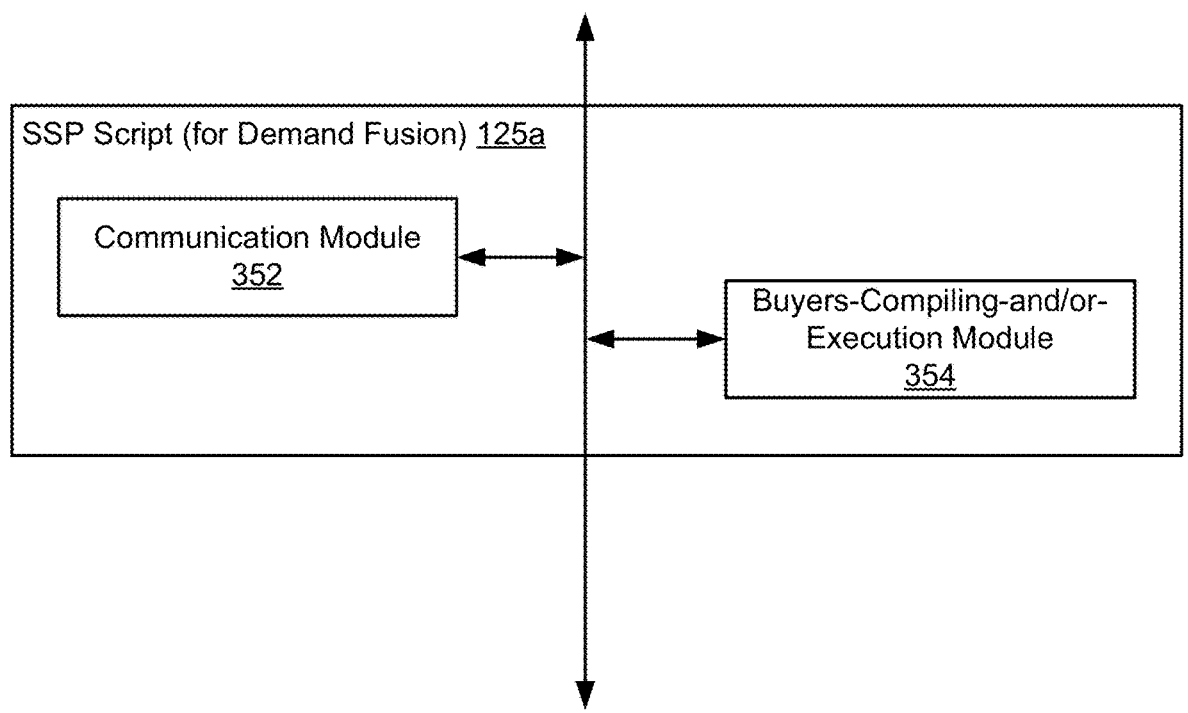
FIG. 3C is an example Supply-side script for demand fusion.

Referring now to FIG. 3C, the SSP script that operates in conjunction with demand fusion is illustrated. The script 125a includes a communication module 352 and a buyers-compiling-and/or-execution module 354. The communication module 352 may be software including routines for facilitating communications on demand market scenarios. In some implementations, the communication module 352 may be a set of instructions executable by the processor 302 to provide the functionalities described below in the flow charts (FIGS. 4 through 7) that determining market demand. In other implementations, the communication module 352 may be stored in the memory 304 and may be accessible and executable by the processor 302. In either implementation, the communication module 352 may be adapted for cooperation and communication with the processor 302, the Network I/F module 308, the memory 304, the display device 310, and the input device 312 via the bus 306.

The buyers-compiling-and/or-execution module 354 may be software including routines for compiling a list of buyers to reside in the browser. In some implementations, the buyers-compiling-and/or-execution module 354 may be a set of instructions executable by the processor 302 to provide the functionalities described below in the flow charts (FIGS. 4 through 7) that facilitate compiling the list of buyers. In other implementations, the buyers-compiling-and/or-execution module 354 may be stored in the memory 304 and may be accessible and executable by the processor 302. In either implementation, the buyers-compiling-and/or-execution module 354 may be adapted for cooperation and communication with the processor 302, the Network I/F module 308, the memory 304, the display device 310, and the input device 312 via the bus 306.

Algorithms for Deterministically Rendering Defaulting Advertisement Chains, Implementing Demand Fusion and Predictive Pricing Operations Referring now to FIG. 4, the process for deterministically determining a non-defaulting advertisement in an advertisement chain and assigning an impression to that advertisement is described, as indicated by reference numeral 400. The process 400 may begin and proceed to block 402, including one or more operations for sending an advertisement request for advertisements. The process proceeds to the next block 404, including one or more operations for receiving an advertisement chain, including a set of possibly defaulting advertisements and non-defaulting advertisements in order to decreasing cost per mille (CPM). The process 400 proceeds to the next block 406 including one or more operations for deterministically determining advertisements in an advertisement chain that delivers the advertisement without defaulting. The process 400 proceeds to the next block 408 including one or more operations for assigning an impression to an advertisement, which delivers the advertisement without defaulting.

FIGS. 5A through 5D represent a continuous flowchart of a specific method 500 for deterministically determining a non-defaulting advertisement in an advertisement chain and assigning an impression to that advertisement. The method 500 begins and proceeds to block 502, including one or more operations for initiating a first processing thread. The method 500 proceeds to block 504 including one or more operations for sending an advertisement request. The method 500 proceeds to the next block 506, including one or more operations for receiving an advertisement chain as a response wherein the advertisement chain includes an ordered list of N (a given number) of advertisements with the following properties: 1) first N−1 advertisements are possibly defaulting advertisements; 2) advertisements are ordered by decreasing cost per mille (CPM); and 3) last advertisement in the chain is non-defaulting. The method 500 proceeds to the next block 508 including one or more operations for removing any previously defaulted iframes from the next advertisement in the advertisement chain. From there, the method 500 proceeds to the next block 510 including one or more operations for sending possible impression events to the advertisement server (e.g., ad server 110) for an advertisement. The method 500 proceeds to the next block 512 including one or more operations for determining whether the advertisement is a defaulting advertisement. The method 500 proceeds to the next decision block 514 including one or more operations for determining if an advertisement is a defaulting advertisement. If the answer is negative, the method 500 proceeds to the next block including one or more operations for rendering the advertisement by adding the advertisement's HTML to a web page. If the answer is affirmative, the method 500 continues via connector "A" to the next block 518 in FIG. 5B including one or more operations for inserting an advertisement's HTML into an iframe. The method 500 proceeds to the next block 520 including one or more operations for attaching attaching "onLoad" listener to the iframe for detecting the ad load. The method 500 proceeds to the next block 522 including one or more operations for attaching the postMessage listener to iframe for detecting a default. The method 500 proceeds to the next block 524 including one or more operations for adding the iframe to the webpage. The method 500 proceeds to the next block 526 for initiating a second processing thread at this point. The method 500 proceeds to the next block 528 including one or more operations for loading advertisement's HTML in an attempt to serve the advertisement. The method 500 proceeds to the next block 530 including one or more operations for determining whether the advertisement defaults. From there, the method proceeds to the next decision block 530 including one or more operations for determining if there are any advertisement defaults. If the answer is negative, the method 500 proceeds to the next block 532 including one or more operations for triggering iframe's load event. From there the method 500 proceeds via connection "C" to FIG. 5D. If the answer at decision block 530 is affirmative, the method 500 proceeds via connector "B" to the FIG. 5C.

Referring now to FIG. 5C, the method 500 proceeds to block 534 including one or more operations for requesting a default resource and executing JavaScript that broadcasts default notification to the advertisement's iframe using postmessage. The method 500 proceeds to the next block 536 including one or more operations for initiating a third processing thread. The method 500 proceeds to the next block 540 including one or more operations for marking an advertisement as defaulted in a tag library's chain model. The method 500 proceeds to the next block 542 including one or more operations for signaling the first processing thread to process the next advertisement in the advertisement chain. From there, the method 500 returns via connector "D" to block 508 in FIG. 5A to proceed to the next advertisement in the advertisement chain, removing any previously defaulted iframes and on.

Figure 5D:
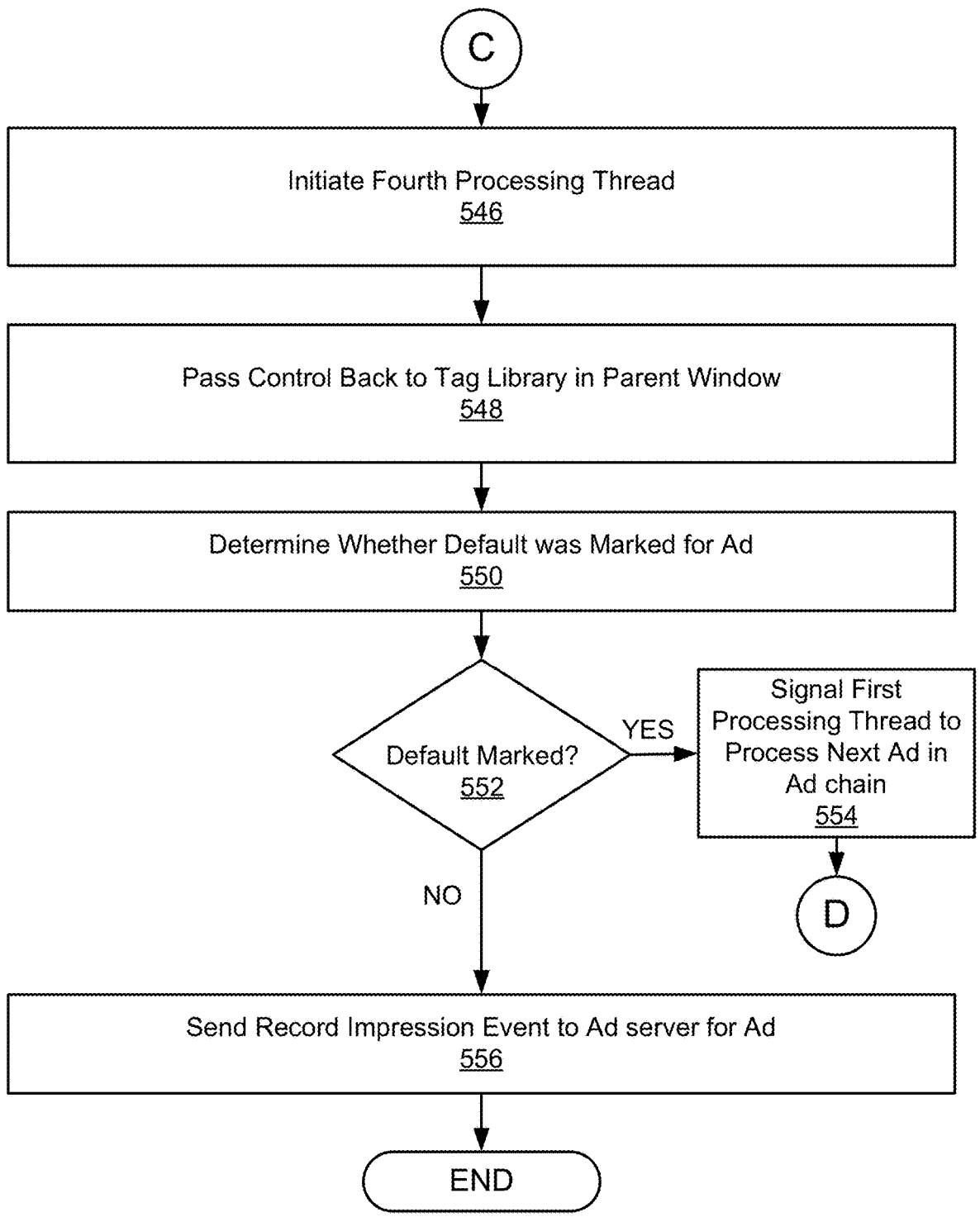

Referring now to FIG. 5D, via connector "C," the method 500 proceeds to the next block 546 including one or more operations for initiating a fourth processing thread. The method proceeds to the next block 548 including one or more operations for passing control back to the tag library in the parent window. The method 500 proceeds to the next block 550 including one or more operations for determining whether the default was marked for the advertisement. The method 500 proceeds to the next decision block 552 presenting a query to determine if the default is marked. If the answer is negative, the method 500 proceeds to the next block 556 including one or more operations for sending a record impression event to an ad server for an advertisement. If the answer is affirmative, the method 500 proceeds to the next block 554 including one or more operations for signaling the first processing thread to process the next advertisement in the advertisement chain. From there, the method 500 returns via connector "D" to block 508 in FIG. 5A.

Figure 6:
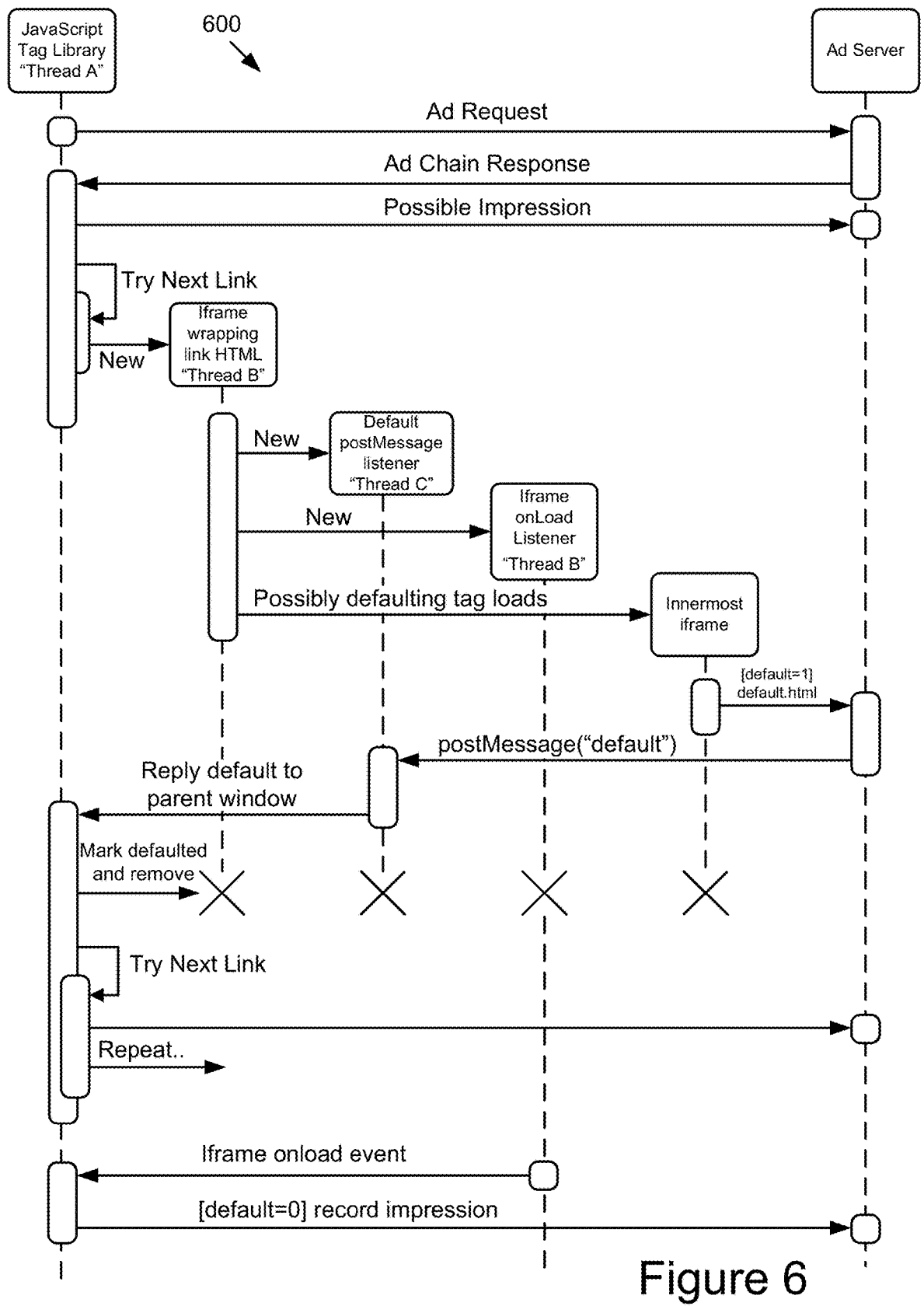
FIG. 6 illustrates an example sequence diagram for deterministic rendering of an ad chain.

Referring now to FIG. 6, an example sequence diagram for deterministic rendering of an advertisement chain is described generally as indicated by reference numeral 600. The first thread, "Thread A" (JavaScript code in the local tag library) may perform the following operations. First, it receives an advertisement chain response from the advertisement server 110 in response to an advertisement request. For the next advertisement link in the chain, the method performs the following operations:
   a. Remove any previously defaulted iframes.
   b. Send a "possible impression" event to the server for this link, possibly bundled with a "record default" event for a previously defaulted link.
   c. If the link is a defaulting ad, the following:
     i. Insert the link's HTML into an iframe.
     ii. Attach an "onLoad" listener to the iframe for detecting the ad load.
     iii. Attach a "postMessage" listener to the iframe for detecting a default.
     iv. Add the iframe to the page. Thread B is scheduled at this point.
   d. Otherwise, the link is the last ad in the chain (non-defaulting):
     i. Render the link by adding its HTML to the page.

Thread B (The HTML in the current link's iframe) performs the following operations:
1. The ad HTML for link loads, attempting to serve an advertisement.
2. If the advertisement defaults, request the default resource:
   a. Execute JavaScript that broadcasts a default notification to link's iframe using "postMessage." Thread C is scheduled at this point.
3. The complete contents of the iframe finish loading, triggering the iframe's "load" event. Thread D is scheduled at this point.

Thread C ("The postMessage" listener attached to the current link's iframe) performs the following operations:

1. A default notification is detected and control is passed back to the tag library in the parent window.
2. Mark that link defaulted in the tag library's chain model.
3. Thread A resumes at step (2) as discussed above with reference to Thread A.

Thread D (The "onLoad" listener attached to the current link's iframe) performs the following operations:
1. Control is passed back to the tag library in the parent window.
2. If a default was marked for link:
   a. Do nothing. Thread A will resume at step (2).
3. Otherwise:
   a. Send a "record impression" event to the server for link.

The algorithm presented here is enhanced and introduces Thread D, a listener for the iframe load event of the current link's iframe. The listener first checks if a default has been marked for its link. Marking the default would have occurred in Thread C, Step 2. This check is necessary because in some web browsers the load event fires at the moment of the iframe's removal from the page. Thus, the "postMessage" listener only fires when a default occurs, but the matching load event may later fire for every defaulting link. In most web browsers, the onLoad listener disappears prior to load firing when its iframe is removed in the postMessage listener.

Another, significant advantage lies in sending "possible impression" and "record default" events to the server (Thread A, step 2b) is no longer necessary for determining the correct impression for the overall process. Sending this information is optional because of its usefulness for calculating default rates or determining if the web page was exited prematurely.

The system and methods for deterministically rendering defaulting advertisement chains have several advantages as they present a desirable solution. This solution is cost-effective because it has the ability to immediately impute the correct impression by completely removing the need for a server-side event aggregation system that latently calculates the correct impression. This is effectively and efficiently accomplished by a few lines of JavaScript code that execute in the user's browser as part of the ad tag library. This solution is always correct because if an impression event is received by the server 110 for an advertisement chain, there is no uncertainty about its correctness. If the user exits the web page prematurely, no impression is incorrectly assumed. In addition, this solution presents better chain serving metrics. The collected record default and possible impression events may be used to determine precisely when the chain rendering process may have stopped prematurely and to calculate the rates at which chain tags default. This solution is deterministic, that is, there is no delay introduced into the flow of an advertisement transaction, allowing chain serving to integrate seamlessly with advertisement serving components that respond greedily to impression events.

Figure 7:
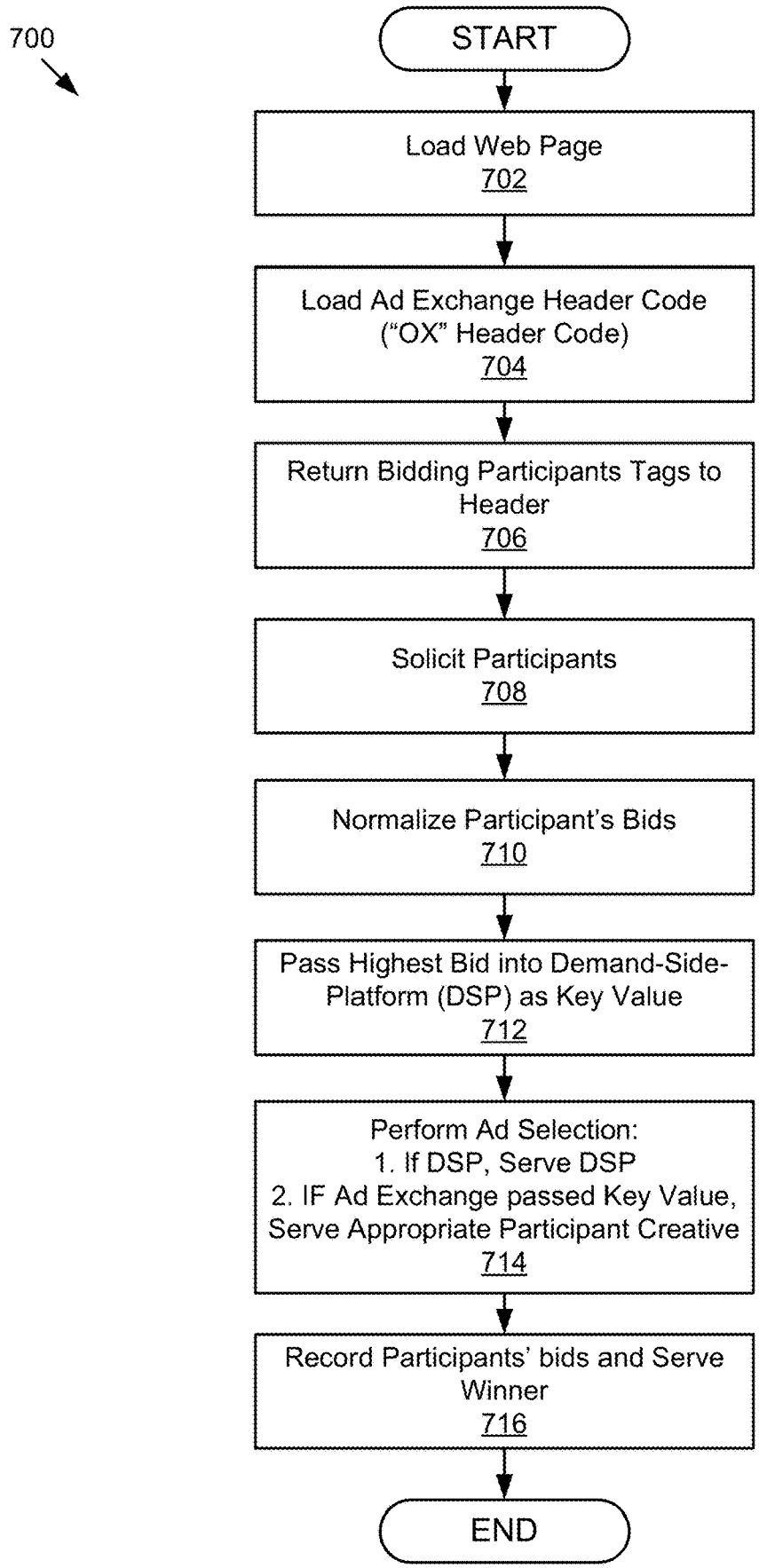
FIG. 7 illustrates a flow chart of an example multi-layer bid implementation in accordance with some aspects of the present architecture and system.

Referring now to FIG. 7, a multi-layer bid structure or implementation is described. This method illustrated generally by reference numeral 700 begins and proceeds to a block 702 including one or more operations for loading a web page from a publisher web site. With loading the web page, the method 700 proceeds to the next block 704 including one or more operations for loading an ad exchange header code ("OX Header Code"). From there, the method 700 proceeds to the next block 706 including one or more operations for returning bidding participants' tags to the header. The method 700 proceeds to the next block 708 including one or more operations for soliciting participants. The method 700 proceeds to the next block 710 including one or more operations for normalizing participants' bids. The method 700 proceeds to the next block 712 including one or more operations for passing the highest bid into the Demand-Side Platform (DSP, e.g., 130 in FIG. 1) as a key value. The method 700 proceeds to the next block 714 including one or more operations for performing an ad selection. If an ad is for the DSP 130, the ad is served to the DSP. If the Ad Exchange passes the key value, the appropriate participant creative is served. The method 700 proceeds to the next block 716 including one or more operations for recording the participants' respective bids and serving the winner.

Figure 8:
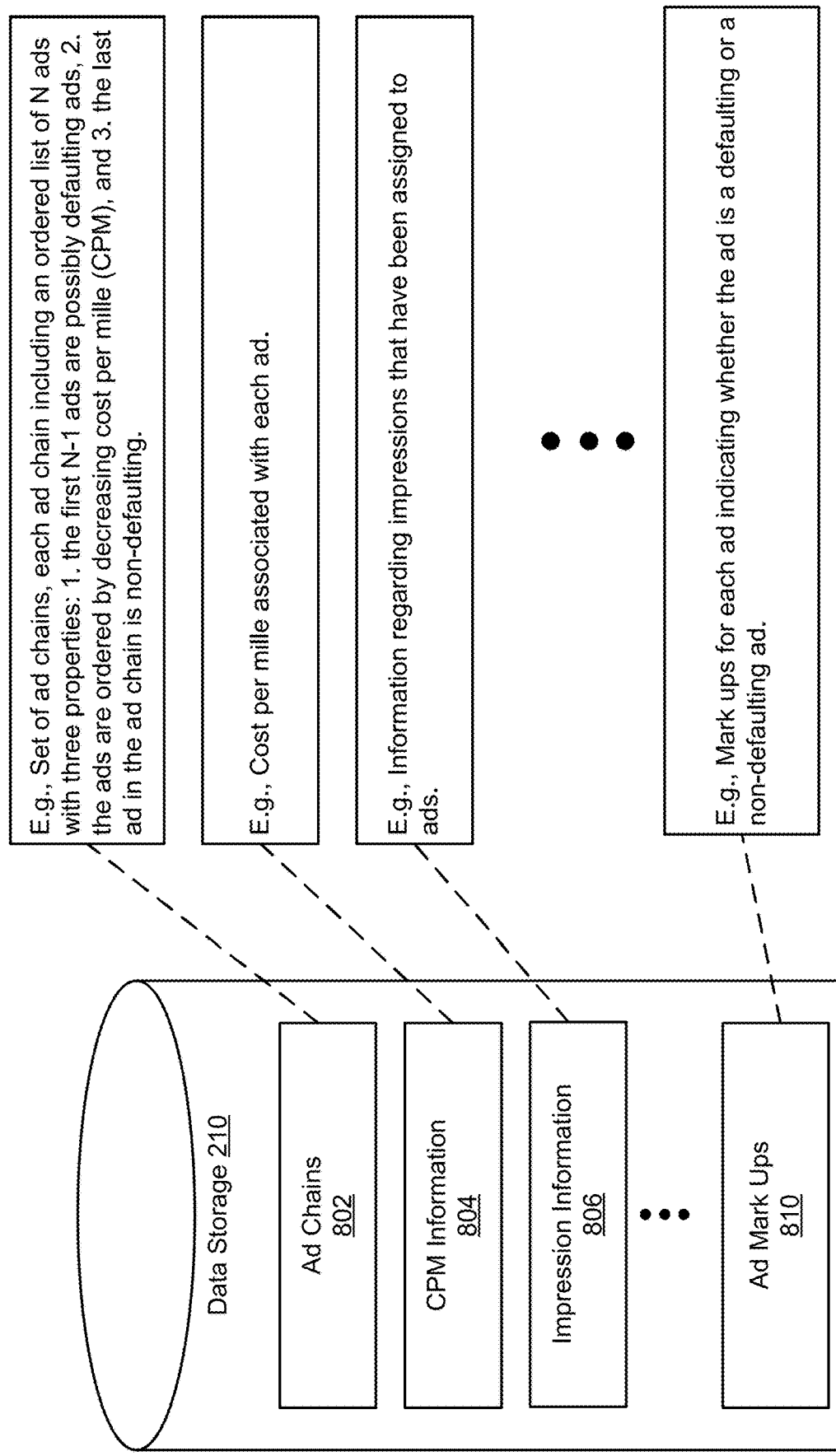
FIG. 8 illustrates a data storage diagram of an example advertisement server.

Referring now to FIG. 8, the data storage 310 is illustrated in greater detail. The storage 310 has memory sectors for storing advertisement chains, indicated by reference numeral 802. Examples may include a set of advertisement chains, each advertisement chain including an ordered list of N advertisements with three properties, primarily, where the first N−1 advertisements are designated as possibly defaulting advertisements. The second category includes advertisements that are ordered by decreasing cost per mille (CPM) and the third category is where the last advertisement in the advertisement chain is non-defaulting. The second memory sector includes CPM information, indicated by reference numeral 804, which represents the cost per mille associated with each advertisement. The third memory sector in the data storage 806 includes impression information, which by way of example, includes information regarding impressions that have been assigned to the advertisements. The fourth memory sector includes "Ad Mark Ups" designated by reference numeral 808, including by way of example, mark ups for each advertisement indicating whether the advertisement is a defaulting or a non-defaulting advertisement.

Figure 9:
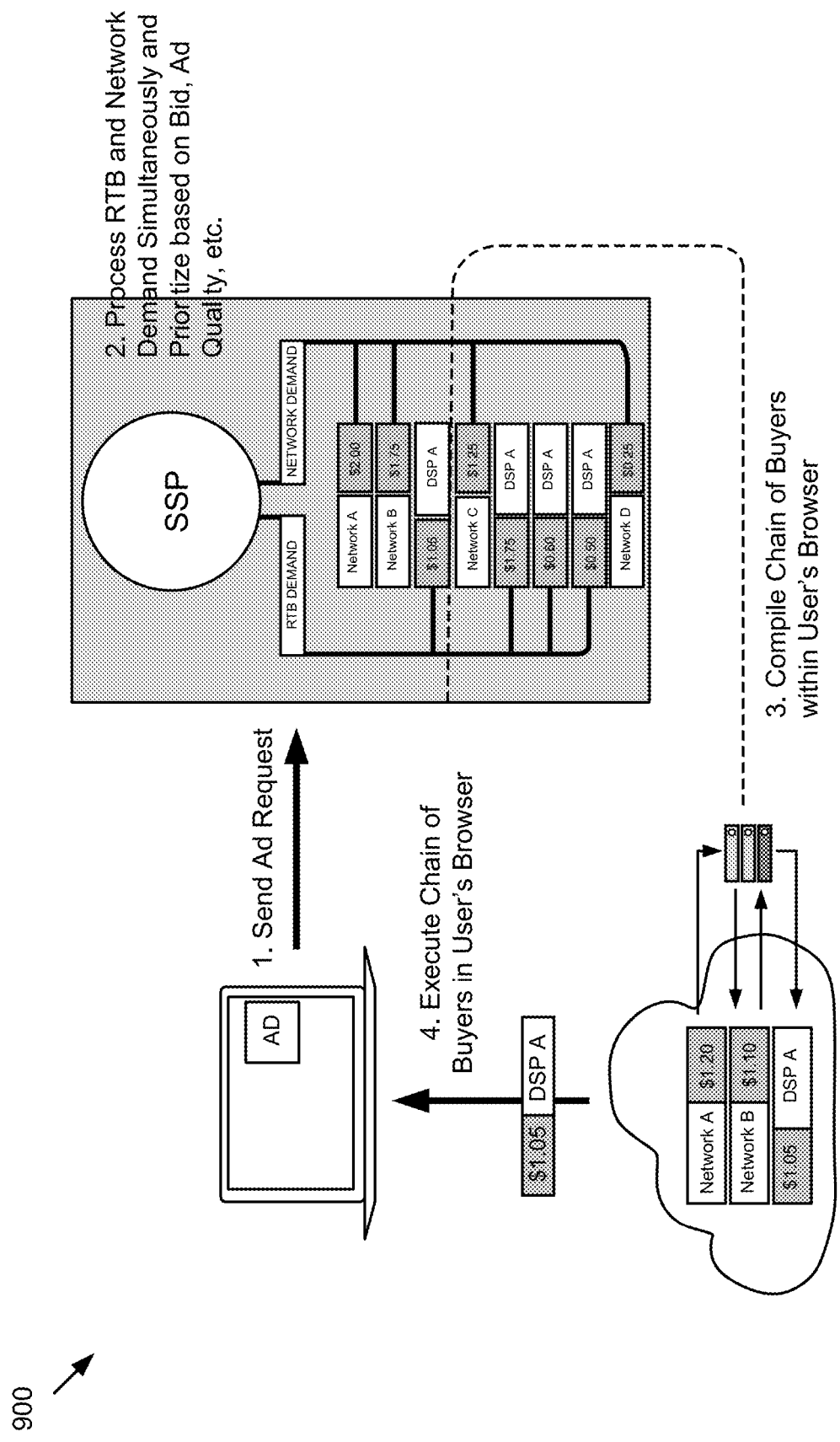
FIG. 9 illustrates example "creatives" and tabs for filtering the "creatives."

Referring now to FIG. 9, an example graphical representation illustrates the online advertising scenario 900 with the improved SSP platform. An ad request for a user's device is transmitted to the enhanced supply-side platform as indicated by the arrow designated by "1." At the supply-side platform, as designated by "2," the RTB and the Network Demand compete simultaneously and prioritize based on bids, advertisement quality, and other factors. The chain of buyers is compiled within the user's browser, eliminating the need to visit from one advertisement server to another. This is designated by reference numeral "3." From the ad network and ad server, the chain is executed in the user's browser as designated by reference numeral "4."

Figure 10:
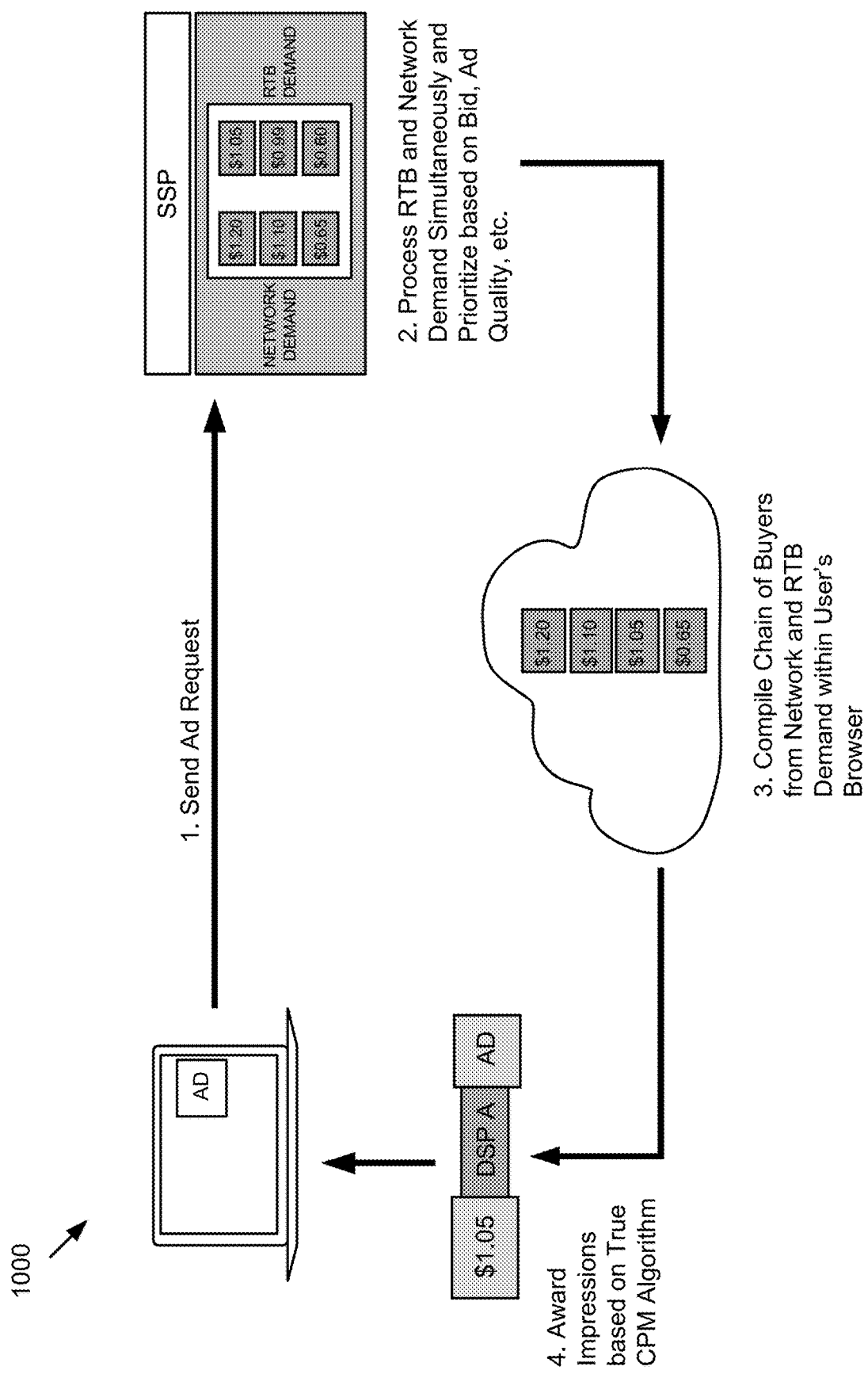
FIG. 10 is a graphical representation illustrating an example report generated by the supply-side platform in accordance with the present invention configured to implement the new features including deterministically rendering defaulting advertisement chains, demand fusion, and predictive pricing.

FIG. 10 illustrates another example graphical representation indicated generally by reference numeral 1000. An Ad request for an Advertisement display is routed to the supply-side platform, which considers the network demand and the RTB demand, by fusing all the channels. The technology considers the network demand and the RTB demand and prioritizes advertisements based on the bids, advertisement quality and other factors that may be used. The technology in the supply-side platform compiles a chain of buyers from the network and the RTB demand within the user's browser, eliminating the need to search from one advertisement server to another. The system awards the impressions based on a true CPM algorithm, which factors the bid with the default rate.

Figure 11:
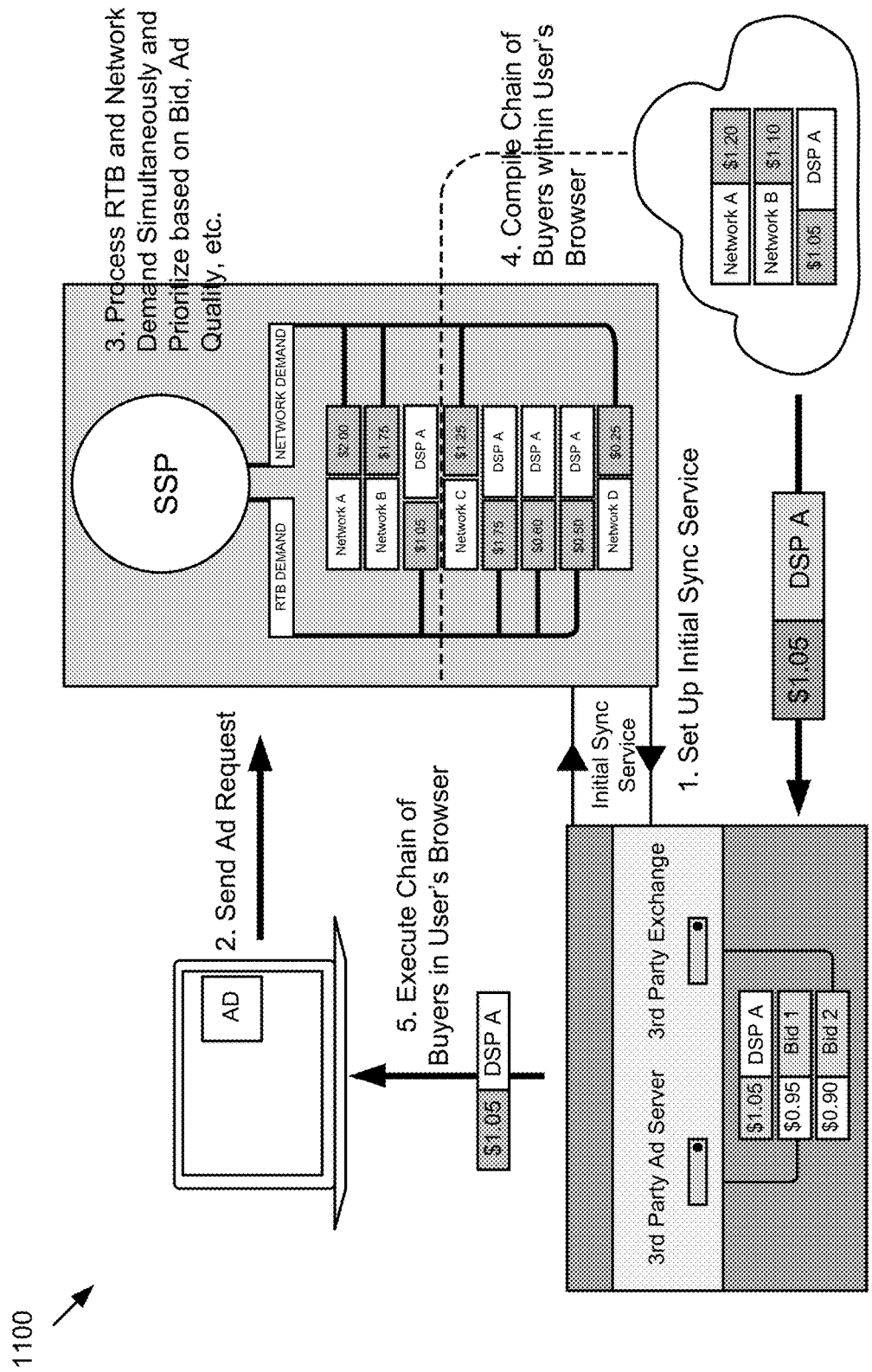
FIG. 11 is a graphical representation illustrating yet another example report generated by the supply-side platform in accordance with the present invention configured to implement the new features including deterministically rendering defaulting advertisement chains, demand fusion, and predictive pricing.

FIG. 11 presents yet another online advertising scenario 1100 with the enhanced SSP platform illustrating how it works with third-party Ad servers. As illustrated, there is an initial synchronization set up between the supply-side platform and the third-party Ad Server and third-party Exchange. This stage is designated by numeral "1." The advertisement request is routed for an advertisement space to the supply-side platform as designated by the numeral "2." The network and RTB demand are simultaneously prioritized based on the bids, advertisement quality, and other factors that may be used. This phase is designated by reference numeral "3."

A chain of buyers are compiled within the user's browser, thereby eliminating the need to visit one ad server to another. This phase is designated by numerals "4" and "5."

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment.

What is claimed is:

1. A method implemented by one or more processors executing instructions stored in a memory for placement of advertising on publisher content, the method comprising:
in a computing device comprising the one or more processors and memory storing executable code with the instructions, causing the one or more processors to execute a plurality of control actions via an interface connection, by executing one or more operations configured to:
receive, by at least one of the one or more processors, an advertisement request from a user device facilitating viewing of the publisher content;
transmit, by at least one of the one or more processors, an advertisement response to the advertisement request from a set of advertisements received by executing a multiple bid structure comprising a header code for querying and returning bid participant tags from multiple bidders, wherein the set of advertisements are arranged in an order of decreasing value;
determine, by at least one of the one or more processors, an advertisement in the advertisement response that is selected based on advertisement-related criteria and delivers an advertisement; and assign, by at least one of the one or more processors, an impression to the advertisement that delivers without defaulting.

2. The method of claim 1, further comprising:
initiating a first processing thread, by at least one of the one or more processors, before sending the advertisement request from the user device.

3. The method of claim 1, wherein a last advertisement in an advertisement chain of the set of advertisements for the advertisement response is designated as a non-defaulting ad.

4. The method of claim 1, further comprising:
designating, by at least one of the one or more processors in the computing device, a next advertisement in an advertisement chain of the set of advertisements for the advertisement response and removing any previously defaulted iframes;
receiving, by at least one of the one or more processors in the computing device, a possible impression event at an advertisement server for the advertisement; and
determining, by at least one of the one or more processors in the computing device, whether the advertisement determined is a defaulting advertisement and if so, rendering the advertisement by adding an advertisement's HTML to the publisher content.

5. The method of claim 4, further comprising:
if the advertisement determined is not a defaulting advertisement, by at least one of the one or more processors in the computing device, inserting code in the advertisement into an advertisement space determined in the publisher content for detecting advertisement characteristics.

6. The method of claim 5, further comprising:
initiate a first processing thread before sending the advertisement request from the user device; and
initiating additional processing threads, by at least one of the one or more processors including at least one of second, third, and fourth processing threads and signaling the first processing thread to provide the next advertisement in the advertisement response.

7. The method of claim 1, further comprising:
determining simultaneously, by at least one of the one or more processors in the computing device, real-time bidding and demand channels and prioritizing based on at least one of the bid participant tags received from the multiple bidders who are buyers and an advertisement quality determined.

8. The method of claim 7, further comprising:
compiling, by at least one of the one or more processors in the computing device, a list of the buyers within the user device.

9. The method of claim 8, further comprising:
executing, by at least one of the one or more processors in the computing device, the list of the buyers within a user's browser on the user device.

10. A system for placement of advertising on viewable publisher content, comprising:
one or more processors; and
memory storing instructions executable by at least one of the processors and causing the at least one of the processors to:
receive an advertisement request from a user device rendering the viewable publisher content, at an advertisement server coupled to the at least one of the processors;
transmit an advertisement response to the advertisement request including a set of advertisements that are received by executing a multiple bid structure comprising a header code operable to query and return bid participant tags from multiple bidders, wherein the set of advertisements are arranged in an order of decreasing value;
determine an advertisement from the advertisement response that delivers an advertisement without defaulting; and
assign an impression to the advertisement that delivers without defaulting.

11. The system of claim 10, wherein the at least one of the processors further:
initiates a first processing thread before sending the advertisement request from the user device.

12. The system of claim 10, wherein a last advertisement in an advertisement chain response including the set of advertisements is designated as a non-defaulting ad.

13. The system of claim 10, wherein the memory further causes the at least one of the processors to:
designate a next advertisement in the advertisement response and remove any previously defaulted iframes;
receive a possible impression event at the advertisement server for the advertisement; and
determine whether the advertisement determined is a defaulting advertisement and if so, rendering the advertisement by adding an advertisement's HTML to the viewable publisher content.

14. The system of claim 13, wherein the memory further causes the at least one of the processors to:
if the advertisement determined is not a defaulting advertisement, insert code in the advertisement into an advertisement space determined in the viewable publisher content operable to advertisement characteristics.

15. The system of claim 14, wherein the memory further causes the at least one of the processors to:
initiate a first processing thread before sending the advertisement request from the user device; and
initiate additional processing threads including at least one of second, third, and fourth processing threads and signal the first processing thread to provide the next advertisement in the advertisement response with multiple bids.

16. The system of claim 10, wherein the instructions in the memory further cause the at least one of the processors to:
determine simultaneously and integrate bids from real-time bidding and demand channels and prioritize based on at least one of the bid participant tags received from buyers and an advertisement quality determined.

17. The system of claim 10, wherein the instructions in the memory further cause the at least one of the processors to:
compile a list of buyers within the user device.

18. The system of claim 10, wherein the instructions in the memory further cause the at least one of the processors to:
execute a list of buyers within a user's browser on the user device.

19. A method, comprising:
in a computing device comprising one or more processors and a memory storing executable code with a plurality of instructions, causing the one or more processors to execute a plurality of control actions via an interface connection, by executing one or more operations configured to:
load, by at least one of the one or more processors, a web page with publisher content for viewing on a user device, said web page having spaces to display advertising;
load with the web page, by at least one of the one or more processors, an instruction set from a header of the web page configured to solicit bidding participants for an advertisement space on the web page;

normalize, by at least one of the one or more processors, bids received from the bidding participants responsive to the instruction set;

determine, by at least one of the one or more processors, a highest bid and passing said highest bid into the one or more ad exchanges as a key value bid; and perform advertisement selection, by at least one of the one or more processors, to determine a winning bid and serving an associated advertisement on said publisher content.

* * * * *